(12) United States Patent
Tsujimoto et al.

(10) Patent No.: US 10,222,016 B2
(45) Date of Patent: Mar. 5, 2019

(54) DAYLIGHTING MEMBER, DAYLIGHTING APPARATUS, ROLL SCREEN, AND BLIND

(71) Applicant: Sharp Kabushiki Kaisha, Sakai, Osaka (JP)

(72) Inventors: Masahiro Tsujimoto, Sakai (JP); Tsuyoshi Kamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 30 days.

(21) Appl. No.: 15/321,816

(22) PCT Filed: Jun. 23, 2015

(86) PCT No.: PCT/JP2015/068018
§ 371 (c)(1),
(2) Date: Dec. 23, 2016

(87) PCT Pub. No.: WO2016/002585
PCT Pub. Date: Jan. 7, 2016

(65) Prior Publication Data
US 2017/0130920 A1    May 11, 2017

(30) Foreign Application Priority Data

Jun. 30, 2014    (JP) .................................. 2014-134805

(51) Int. Cl.
*F21S 11/00*    (2006.01)
*E06B 5/00*    (2006.01)
(Continued)

(52) U.S. Cl.
CPC ............... *F21S 11/007* (2013.01); *E06B 5/00* (2013.01); *E06B 7/00* (2013.01); *E06B 9/24* (2013.01);
(Continued)

(58) Field of Classification Search
CPC ..................................................... F21S 11/007
(Continued)

(56) References Cited

U.S. PATENT DOCUMENTS 4,673,609 A * 6/1987 Hill .................. B32B 17/10247
219/203
5,802,784 A    9/1998 Federmann
(Continued)

FOREIGN PATENT DOCUMENTS

| JP | 06-033671 A | 2/1994 |
| JP | 09-218374 A | 8/1997 |

(Continued)

OTHER PUBLICATIONS

Official Communication issued in International Patent Application No. PCT/JP2015/068018, dated Sep. 15, 2015.

*Primary Examiner* — Christopher E Mahoney
(74) *Attorney, Agent, or Firm* — Keating & Bennett, LLP

(57) ABSTRACT

A daylighting member includes a first daylighting section and a second daylighting section having different daylighting properties from the first daylighting section. The first daylighting section includes an optically transparent first substrate and a plurality of optically transparent daylighting portions provided on a first surface of the first substrate. The first daylighting section diffuses incoming light in a desired direction and emits the incoming light. The second daylighting section diffuses and emits the incoming light. The first daylighting section and the second daylighting section are placed side by side in a direction intersecting a direction in which the daylighting portions extend.

15 Claims, 26 Drawing Sheets

(51) Int. Cl.
  *E06B 9/24* (2006.01)
  *G02B 5/00* (2006.01)
  *G02B 5/02* (2006.01)
  *E06B 7/00* (2006.01)
  *E06B 9/386* (2006.01)
  *E06B 9/40* (2006.01)
  *G02B 19/00* (2006.01)

(52) U.S. Cl.
  CPC ............... *E06B 9/386* (2013.01); *E06B 9/40* (2013.01); *F21S 11/00* (2013.01); *G02B 5/00* (2013.01); *G02B 5/02* (2013.01); *G02B 5/0278* (2013.01); *G02B 19/0019* (2013.01); *G02B 19/0042* (2013.01); *E06B 2009/2405* (2013.01); *E06B 2009/2417* (2013.01)

(58) Field of Classification Search
  USPC .......................................................... 359/591
  See application file for complete search history.

(56) References Cited

U.S. PATENT DOCUMENTS

| | | | |
|---|---|---|---|
| 7,851,054 B2 | 12/2010 | Weber et al. | |
| 9,857,041 B2* | 1/2018 | Ueki | F21S 11/007 |
| 2009/0009870 A1 | 1/2009 | Usami | |
| 2011/0043919 A1 | 2/2011 | Ko et al. | |
| 2013/0033873 A1 | 2/2013 | Suzuki et al. | |
| 2013/0265642 A1* | 10/2013 | Vasylyev | G02B 19/0042 359/595 |
| 2013/0293963 A1* | 11/2013 | Lydecker | F21S 11/00 359/591 |
| 2014/0104689 A1 | 4/2014 | Padiyath et al. | |
| 2015/0219830 A1 | 8/2015 | Nohara et al. | |
| 2015/0354272 A1* | 12/2015 | Vasylyev | E06B 9/42 160/133 |
| 2016/0273724 A1* | 9/2016 | Sakuragi | E06B 3/66 |
| 2017/0307160 A1* | 10/2017 | Ueki | F21S 11/002 |
| 2017/0362883 A1* | 12/2017 | Kanno | E06B 3/67 |

FOREIGN PATENT DOCUMENTS

| | | |
|---|---|---|
| JP | 2008-040021 A | 2/2008 |
| JP | 2011-227120 A | 11/2011 |
| JP | 2013-014909 A | 1/2013 |
| JP | 2014-047572 A | 3/2014 |
| KR | 10-2011-0012970 A | 2/2011 |

* cited by examiner

DAYLIGHTING MEMBER, DAYLIGHTING APPARATUS, ROLL SCREEN, AND BLIND

TECHNICAL FIELD

The present invention relates to a daylighting member, a daylighting apparatus, a roll screen, and a blind.

The present disclosure contains subject matter related to that disclosed in Japanese Patent Application No. 2014-134805 filed in the Japan Patent Office on Jun. 30, 2014, the entire contents of which are hereby incorporated by reference.

BACKGROUND ART

Conventionally, the use of a daylighting member has been suggested as a technique for effectively letting natural light (sunlight) from outside a building into the building through a window pane or the like (see, for example, Patent Literature 1).

The daylighting member includes an optically transparent film (substrate) and a plurality of prismatic bodies (protruding portions) or the like formed on one surface of the optically transparent film. By being bonded to the window pane, the daylighting member changes, with use of the prismatic bodies, the traveling direction of light falling on the window pane and, at the same time, aims the light at a ceiling, a side wall, a floor, or the like inside the building.

Further, the light traveling toward the ceiling is reflected by the ceiling to illuminate the inside of the room and, as such, serves as a substitute for illuminating light.

Therefore, the user of such a daylighting member is expected to bring about an energy-saving effect of saving energy that is consumed by lighting facilities inside a building during the day.

CITATION LIST

Patent Literature

PTL 1: Japanese Unexamined Patent Application Publication No. 2013-14909

SUMMARY OF INVENTION

Technical Problem

Conventionally, the daylighting member has been installed in a region on the upper part of the window pane. However, extending a daylighting region (daylighting area) to a region on the lower part of the window pane (i.e. a range up to the upper or lower side of the line of sight of a person who is in the room) in order to increase the amount of daylighting makes it easy for light emitted from the daylighting member to get into the eyes of the person, thus undesirably causing the person to feel dazzled. Light that a person feels dazzling is called "glare".

An aspect of the present invention has been made in view of the problems with the conventional art and can provide a daylighting member, a daylighting apparatus, a roll screen, and a blind that can suppress an increase in light (glare) that is felt dazzling and, at the same time, ensure a lighted environment inside a room by letting in more natural light (sunlight) from outside.

Solution to Problem

A daylighting member according to an aspect of the present invention preferably includes: a first daylighting section; and a second daylighting section having different daylighting properties from the first daylight section, wherein the first daylighting section includes an optically transparent first substrate and a plurality of optically transparent protruding portions provided on a first surface of the first substrate, the first daylighting section reflects incoming light in a desired direction and emits the incoming light, the second daylighting section diffuses and emits the incoming light, the first daylighting section and the second daylighting section are placed side by side in a direction parallel to the first surface, each of the protruding portions has a side surface a part of which functions as a reflection surface that reflects light having entered the protruding portion, a given ray of light of the light having entered the protruding portion passes through a point F at which the ray of light is falls on the reflection surface, and in a case where, of two spaces bordering across a virtual plane perpendicular to the first surface of the first substrate, a first space is a space in which the ray of light falling at the point F is present and a second space is a space in which the ray of light falling at the point F is not present, light emitted from the first substrate or the protruding portion by being reflected by the reflection surface has a property of traveling into the first space.

In the daylighting member according to the aspect of the present invention, it is preferable that the first daylighting section and the second daylighting section be placed side by side in a direction intersecting a direction in which the protruding portions extend.

The daylighting member according to the aspect of the present invention may be configured to further include a light amount adjusting section provided between the first daylighting section and the second daylighting section so as to adjust an amount of transmitted light, wherein the light amount adjusting section transmits a smaller amount of light than does each of the first and second daylighting sections.

The daylighting member according to the aspect of the present invention may be configured such that the light amount adjusting section has such a property that the amount of transmitted light becomes gradually smaller from the first daylighting section toward the second daylighting section.

The daylighting member according to the aspect of the present invention may be configured to further include a transparent member provided between the first daylighting section and the second daylighting section, wherein the transparent member transmits light in a state where an angle of incidence of the incoming light and an angle of emission of outgoing light are substantially equal.

The daylighting member according to the aspect of the present invention may be configured such that the second daylighting section is anisotropic in direction of diffusion of light and diffuses the light more strongly in a direction parallel to a direction intersecting a direction of placement of the first and second spaces than in the direction of placement.

The daylighting member according to the aspect of the present invention may be configured such that the second daylighting section isotropically diffuses and emits the incoming light.

The daylighting member according to the aspect of the present invention may be configured such that the second daylighting section has such a property as to become gradually lower in light transmittance from a first end side thereof that faces the first daylighting section toward a second end side of the second daylighting section.

The daylighting member according to the aspect of the present invention may be configured such that the second daylighting section contains a luminescence material.

A daylighting apparatus according to an aspect of the present invention may include: a daylighting member; and an adhesive layer for sticking the daylighting member to an object of installation.

A daylighting apparatus according to an aspect of the present invention may include: a daylighting member; and a fitting section for detachably fitting the daylighting member in an object of installation.

A daylighting apparatus according to an aspect of the present invention preferably includes: a daylighting mechanism; and a light-blocking mechanism hung in a vertical direction from a lower part of the daylighting mechanism, wherein the daylighting mechanism is the daylighting member, and the light-blocking mechanism is a roll screen or a blind.

A roll screen according to an aspect of the present invention preferably includes:

a daylighting screen; and a winding mechanism that makes the daylighting screen freely windable, wherein the daylighting screen is the daylighting member.

A blind according to an aspect of the present invention preferably includes: a plurality of first slats arranged side by side at predetermined intervals in a first region; a plurality of second slats arranged side by side at predetermined intervals in a second region placed next to the first region in a direction intersecting a direction in which the first slats extend; and a tilting mechanism that supports the first slats and second slats so that the first slats and second slats are freely tilted to each other, wherein each of the first slats is the first daylighting section of the daylighting member, and each of the second slats is the second daylighting section of the daylighting member.

Advantageous Effects of Invention

As stated above, an aspect of the present invention has as an object to provide a daylighting member, a daylighting apparatus, a roll screen, and a blind that can suppress an increase in glare and, at the same time, ensure a lighted environment inside a room by letting in more natural light (sunlight) from outside.

DESCRIPTION OF EMBODIMENTS

Embodiments of the present invention are described in detail below with reference to the drawings.

It should be noted that, to facilitate visualization of each constituent element, all of the following drawings may illustrate some constituent elements on different dimension scales. Further, to facilitate visualization of configurations, some cross-sectional views may omit to illustrate hatching.

[First Embodiment]
(Daylighting Member)

Figure 1:
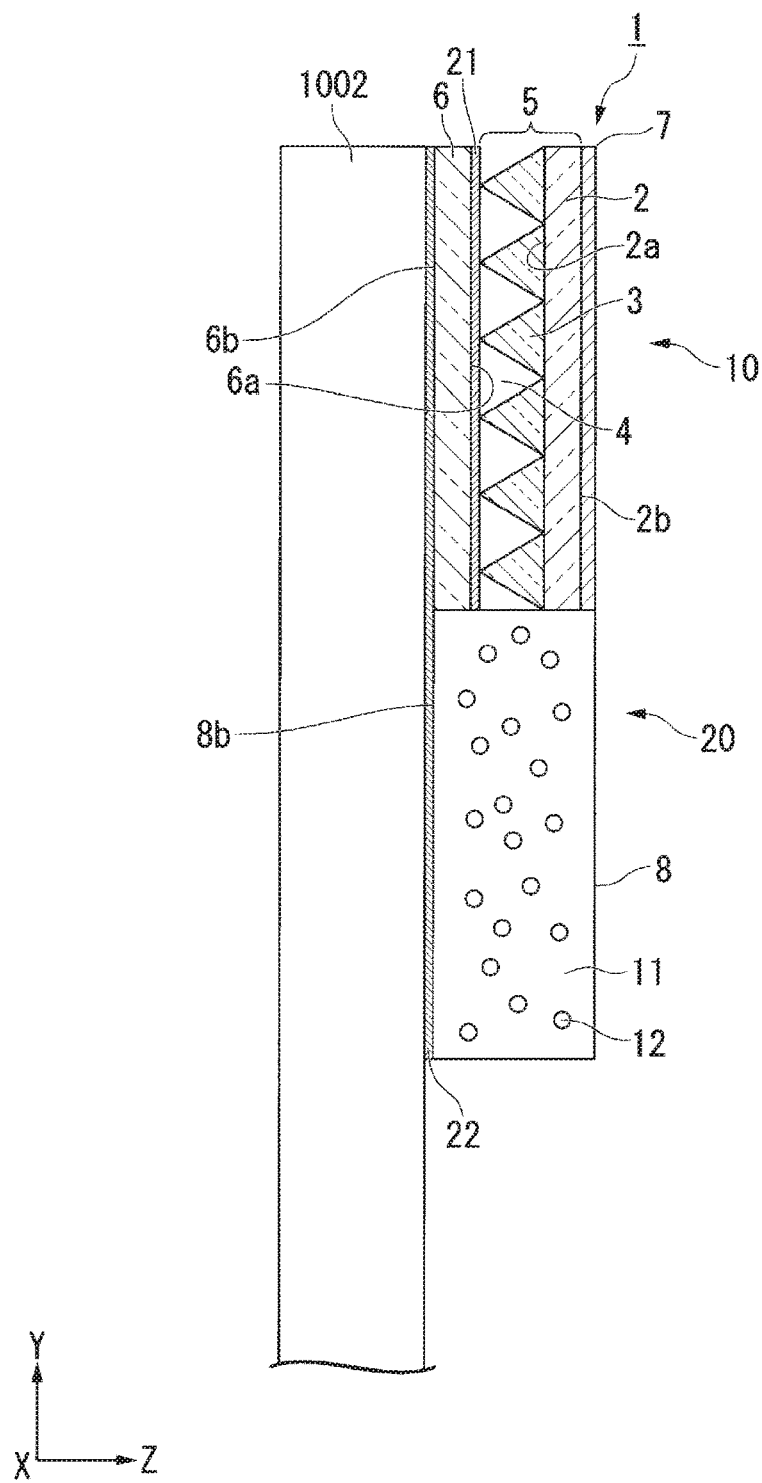
FIG. 1 is a cross-sectional view schematically showing a configuration of a daylighting member according to a first embodiment.
Figure 2:
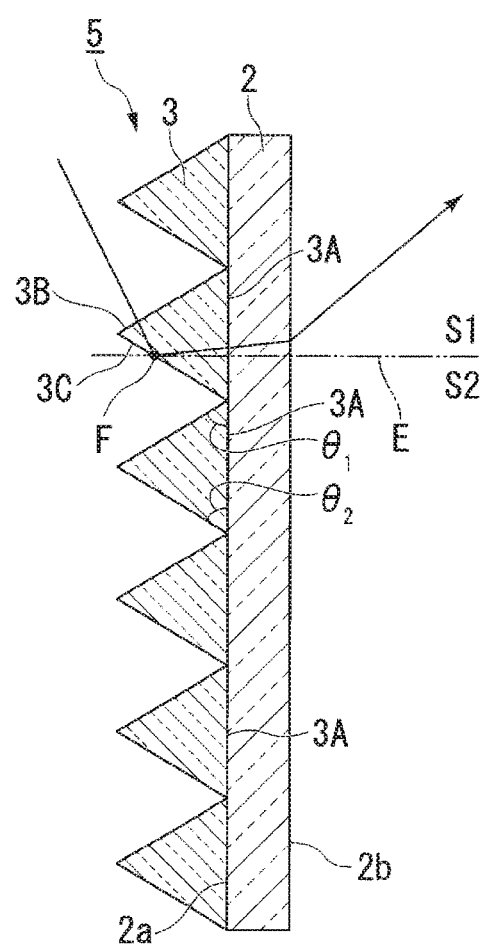
FIG. 2 is an enlarged cross-sectional view of daylighting portions constituting a daylighting sheet.
Figure 3:
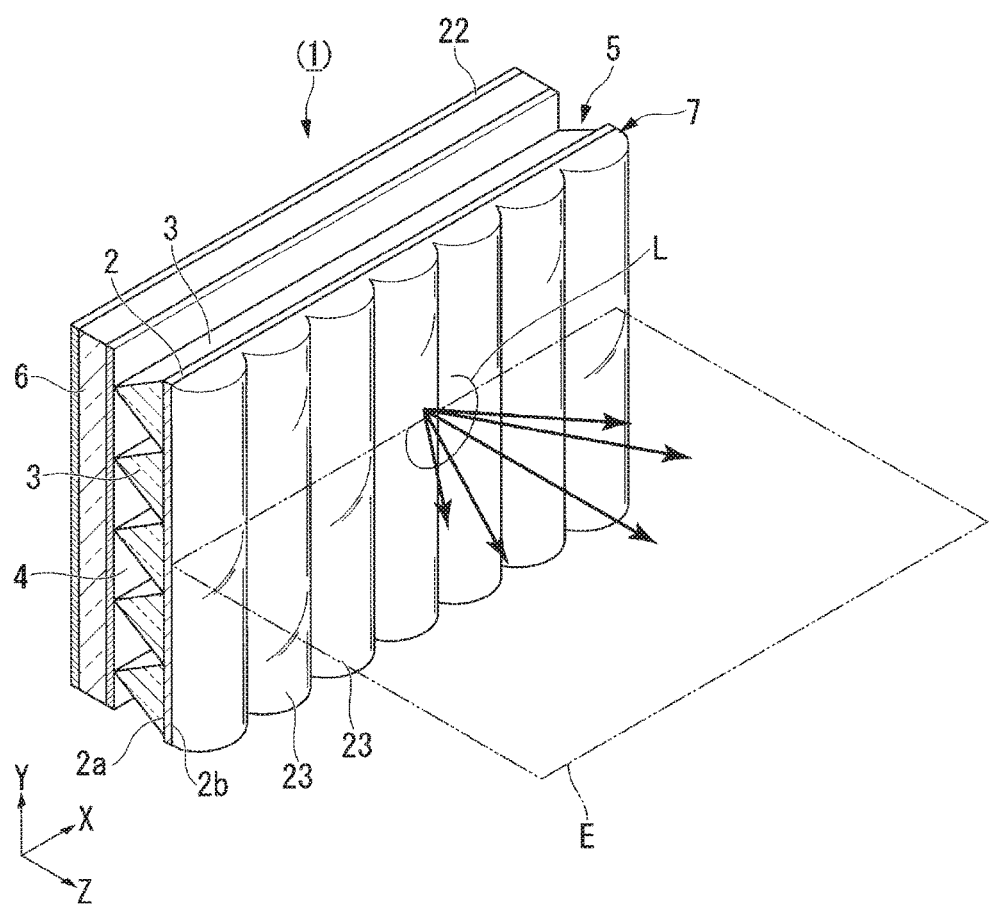
FIG. 3 is a perspective view of the daylighting member with a focus on an anisotropic light-diffusing sheet.

First, a daylighting member 1 shown in FIG. 1 is described as an example of a daylighting apparatus according to a first embodiment of the present invention. It should be noted that FIG. 1 is a cross-sectional view schematically showing a configuration of the daylighting member 1 according to the first embodiment. FIG. 2 is an enlarged cross-sectional view showing daylighting portions constituting a daylighting sheet 5. FIG. 3 is a perspective view of the daylighting member 1 with a focus on an anisotropic light-diffusing sheet 7.

The daylighting member 1 of the present embodiment is used, for example, for letting sunlight inside a room with the daylighting member 1 bonded to a window pane 1002. As shown in FIG. 1, the daylighting member 1 includes a first daylighting section 10 and a second daylighting section 20 having different daylighting properties from the first daylighting section 10. The first daylighting section 10 and the second daylighting section 20 are placed side by side in a vertical direction (Y direction). The first daylighting section 10 has a function of reflecting incoming light in a desired direction (upward) and emits the incoming light toward a ceiling inside the room. Further, the second daylighting section 20 has a function of isotropically diffusing the incoming light and emitting the incoming light to the inside of the room.

The daylighting member 1 is bonded to the window pane 1002 in such an orientation that the first daylighting section 10 is located on the upper side and the second daylighting section 20 is located on the lower side.

The first daylighting section 10 mainly includes the daylighting sheet 5, a bonding substrate 6, and the anisotropic light-diffusing sheet 7. Meanwhile, the second daylighting section 20 includes a light-scattering sheet 8.

The daylighting sheet 5 of the first daylighting section 10 includes an optically transparent first substrate 2, a plurality of optically transparent daylighting portions (protruding portions) 3 provided on a first surface 2a of the first substrate 2, and a void part 4 formed between each of the daylighting portions 3 and the other.

As the first substrate 2, an optical transparent substrate containing a resin such as a thermoplastic polymer, a thermosetting resin, or a photopolymerizable resin is used. An optically transparent substrate containing an acrylic polymer, an olefinic polymer, a vinyl polymer, a cellulose polymer, an amide polymer, a fluorinated polymer, a urethane polymer, a silicone polymer, an imide polymer, or the like is used. Specifically, an optically transparent substrate such as a triacetyl cellulose (TAC) film, a polyethylene terephthalate (PET) film, a cycloolefin polymer (COP) film, a polycarbonate (PC) film, a polyethylene naphthalate (PEN) film, a polyether sulfone (PES) film, or a polyimide (PI) film is preferably used. In the present embodiment, as an example, a PET film having a thickness of 100 μm is used. It is preferable that the first substrate 2 have a total light transmittance of, for example, 90% or higher. This gives sufficient transparency.

The daylighting portions 3 are made of an optical transparent and photosensitive organic material such as acrylic resin, epoxy resin, or silicone resin. A transparent resin mixture obtained by mixing a polymerization initiator, a coupling agent, a monomer, an organic solvent, and the like into this resin can be used. Furthermore, the polymerization initiator may contain various types of additional component such as a stabilizer, an inhibitor, a plasticizer, a fluorescent brightening agent, a mold release agent, a chain transfer agent, and another photopolymerizable monomer. It is preferable that the daylighting portions 3 have a total light transmittance of 90% or higher. This gives sufficient transparency.

Each of the daylighting portions 3 is a member which stretches out long and thin in a linear fashion in one direction (i.e. a direction perpendicular to the paper surface of FIG. 1) and which has a triangular cross-section orthogonal to a longitudinal direction.

The longitudinal direction of the daylighting portion 3 is parallel to one side of the first substrate 2. The plurality of daylighting portions 3 are arranged parallel to one another in a vertical direction.

Note here that, as shown in FIG. 2, each of the daylighting portions 3 has an isosceles triangular cross-section as an example of the triangular cross-section. In the cross-sectional shape of the daylighting portion 3, an angle $\theta_1$ formed by a base 3A and a surface 3B and an angle $\theta_2$ formed by the base 3A and a surface 3C are each 65 degrees. Further, the daylighting portion 3 has a function of letting sunlight inside a room by causing light having entered through one of the surfaces 3B and 3C, namely the surface 3B, to be reflected by the other surface 3C. The other surface 3C is hereinafter referred to as "reflection surface 3C".

Of the light having entered the daylighting portion 3, a given ray of light falls on the reflection surface 3C at a point F, passes through the point F, and exits through the base 3A. Note here that, of two spaces S1 and S2 bordering across a virtual plane E perpendicular to the first surface 2a of the first substrate 2 and parallel to a direction (X direction) in which the daylighting portion 3 extends, the space S1 is a space in which the ray of light falling at the point F is present and the space S2 is a space in which the ray of light falling at the point F is not present. In this case, the daylighting portion 3 has a property of causing the light reflected by the reflection surface 3C to exit through a second surface 2b of the first substrate 2 and travel into the space S1.

It should be noted that the shape of the cross-section of the daylighting portion 3 orthogonal to the longitudinal direction is not limited to the aforementioned shape. Instead of being a triangle, the shape of the cross-section may be a polygon such as a trapezoid, a pentagon, or a hexagon or be a shape whose outside surface is partially curved.

Air is present in the void part 4. Therefore, the void part 4 has a refractive index of approximately 1.0. The refractive index of 1.0 of the void part 4 minimizes a critical angle at the interface between the void part 4 and a daylighting portion 3. Although the void part 4 is an air layer composed of air in the case of the present embodiment, the void part 4 may alternatively be an inert gas layer composed of an inert gas such as nitrogen or be a reduced-pressure layer that is in a reduced-pressure condition.

With continued reference to FIG. 1, the bonding substrate 6 is disposed so as to face the first surface 2a of the first substrate 2 across the plurality of daylighting portions 3. The bonding substrate 6 is stuck to the daylighting sheet 5 by a first adhesive layer 21 provided between a first surface 6a and the plurality of daylighting portions 3.

The anisotropic light-diffusing sheet 7 is provided on the second surface 2b of the first substrate 2 and stuck to the daylighting sheet 5 by an adhesive layer (not illustrated). The anisotropic light-diffusing sheet 7 is designed to cause light emitted from the daylighting sheet 5 to strongly diffuse in a horizontal direction. Specifically, the anisotropic light-diffusing sheet 7 causes the light emitted from the daylighting sheet 5 to diffuse more strongly in a direction parallel to the direction (X direction) in which the plurality of daylighting portions 3 extend than in a direction (Y direction) intersecting the direction in which the plurality of daylighting portions 3 extend.

As shown in FIG. 3, the anisotropic light-diffusing sheet 7 is constituted by a lenticular lens including a plurality of convex lenses 23. The plurality of convex lenses 23 each extend in the vertical direction (Y direction), and are arranged parallel to one another in a direction (X direction) intersecting the direction in which each of the convex lenses 23 extends. That is, the direction in which the plurality of convex lenses 23 are arranged (extend) is orthogonal to the direction in which the plurality of daylighting portions 3 of the daylighting sheet 5 are arranged (extend).

Each of the convex lenses 23 has a lens surface with a curvature in a horizontal plane but without a curvature in the vertical direction. For this reason, the convex lenses 23 have light diffusion properties in a horizontal direction but do not have light diffusion properties in the vertical direction. Therefore, the light is diffusely emitted in the horizontal direction while maintaining a vertical distribution of angles as it was when the light was emitted from the daylighting sheet 5 (daylighting portions 3).

The anisotropic light-diffusing sheet 7 is separate from the daylighting sheet 5. Alternatively, the anisotropic light-diffusing sheet 7 may be integrated with the daylighting sheet 5. For example, the plurality of convex lenses 23 may be formed integrally with the first substrate 2 by processing the second surface 2b of the first substrate 2 of the daylighting sheet 5.

With continued reference to FIG. 1, the light-scattering sheet 8 of the second daylighting section 20 includes an optically transparent resin 11 and a plurality of light-scattering bodies 12 dispersed in the resin 11. The resin 11 may be a transparent resin mixture obtained by mixing a polymerization initiator, a coupling agent, a monomer, an organic solvent, and the like into a resin such as acrylic resin, epoxy resin, or silicone resin. The polymerization initiator may contain various types of additional component such as a stabilizer, an inhibitor, a plasticizer, a fluorescent brightening agent, a mold release agent, a chain transfer agent, and another photopolymerizable monomer.

The light-scattering bodies 12 act to scatter the incoming light. The light-scattering bodies 12 are particles (small pieces) having a different refractive index from the resin 11. It is desirable that the light-scattering bodies 12 be mixed in the light-scattering sheet 8 and dispersed without agglutinating.

The light-scattering bodies 12 are made, for example, of an optically transparent material containing glass or a resin such as an acrylic polymer, an olefinic polymer, a vinyl polymer, a cellulose polymer, an amide polymer, a fluorinated polymer, a urethane polymer, a silicone polymer, or an imide polymer. Alternatively, the light-scattering bodies 12 may be bubbles dispersed in the resin 11. The shape of each of the light-scattering bodies 12 may for example be a spherical shape, an oval spherical shape, a plate shape, a polyhedron, or the like.

The size of each of the light-scattering bodies 12 needs for example be approximately 0.5 to 20 µm. The light-scattering bodies 12 may be the same in size as or different in size from one another.

The light-scattering sheet 8 is not necessarily limited to the configuration in which the light-scattering bodies 12 are dispersed in the resin 11, but may alternatively be constituted by a layer having asperities formed on a surface thereof. In this case, asperities may be directly formed on the indoor side of the resin 11 on which no light-scattering bodies 12 are provided.

The daylighting member 1 is constituted by the first daylighting section 10 and the second daylighting section 20 being placed side by side in a direction parallel to the first surface 2a of the first substrate 2, i.e. a direction (Y direction) intersecting the direction (X direction) in which the plurality of daylighting portions 3 extend. It should be noted that the first daylighting section 10 and the second daylighting section 20 may be integrated with or separate from each other.

The daylighting member 1 thus configured is installed by being wholly bonded to the window pane 1002 via a second adhesive layer 22 provided on one surface of each of the first and second daylighting sections 10 and 20. Specifically, the second adhesive layer 22 has such a size as to cover the whole of a surface extending from a second surface 6b of the bonding substrate 6 to a second surface 8b of the light-scattering sheet 8.

The following describes an example of a room model in which the daylighting member 1 of the present embodiment is installed on a window.

Figure 4:
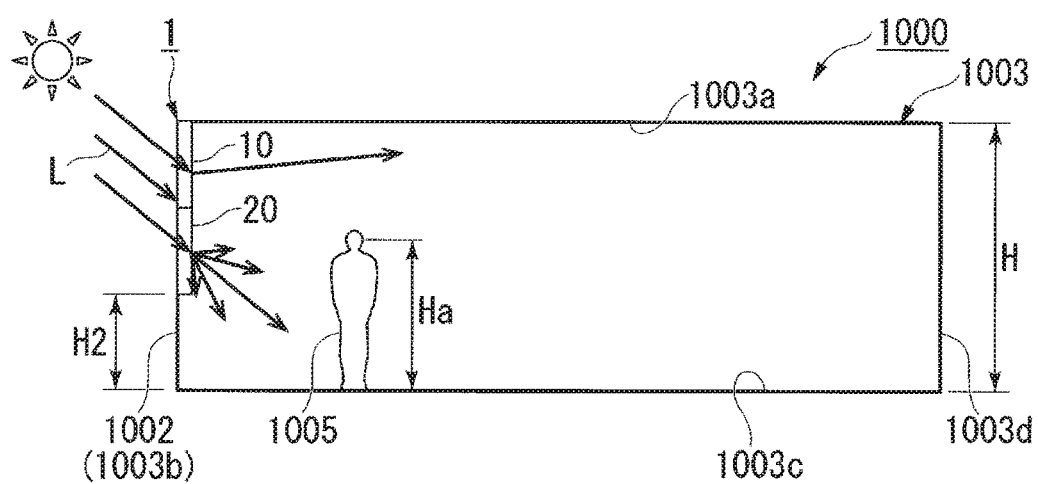
FIG. 4 is a diagram showing an example of a room model.

FIG. 4 is a diagram showing an example of a room model 1000.

FIG. 4 illustrates a room 1003, a ceiling 1003a, a wall 1003b on which sunlight falls, a window pane 1002 provided in the wall 1003b in a vertically-extended manner, a floor 1003c, a wall 1003d facing the wall 1003b, and a person 1005 standing on the floor 1003c.

As shown in FIG. 4, the room 1003 is an example of an office and has a rectangular cross-section. The height H of the room 1003 (i.e. the height from the floor 1003c to the ceiling 1003a) is for example 2.7 m. For example, assuming that the room 1003 has a window on one surface, the height H2 from the floor 1003c of the daylighting member 1 installed on the window pane 1002 is for example 0.7 m.

Further, it is assumed that the position of the eyes of the person 1005 is for example 0.8 m to 1.8 m above the floor 1003c. For example, the eye height Ha of the person 1005 standing on the floor 1003c is 1.7 m. The range of positions of the eyes of the person 1005 is estimated on the basis of this eye height Ha.

The first daylighting section 10 of the daylighting member 1 installed on the window pane 1002 is present in a part of the window pane 1002 that does not obstruct the line of sight of the person 1005 (e.g. a part located 0.7 m below the ceiling 1003a). The second daylighting section 20 is present in a part (below the first daylighting section 10) of the window pane 1002 that obstructs the line of sight of the person 1005.

(Ray-Trace Simulations)

The following reports the results of investigation of the properties of daylighting members of Comparative Examples 1 to 3 and the properties of the daylighting member 1 of the present embodiment by ray-trace simulations.

The places at which the simulations were conducted were in Japan. The parameters of each of the simulations were as follows: the time at which the simulation was conducted was the culmination of the vernal equinox; the solar altitude (angle of incidence) was 55 degrees; the vertical illuminance of direct light from the sun onto the window was 48373 lx; the diffusion of the direct light in solar view was 0.52 deg; and the azimuth of the window on which the daylighting member is installed was south.

Figure 5A:
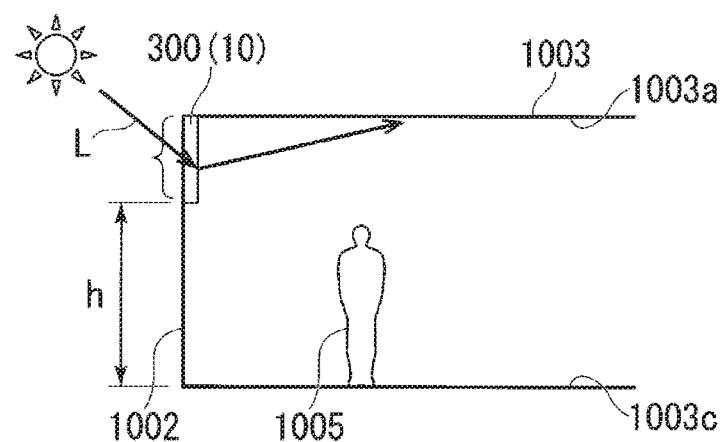
FIG. 5A is a diagram showing a room model in which a daylighting member of Comparative Example 1 (i.e. a daylighting member having the same function as a first daylighting section of the first embodiment) was installed on the upper part of a window pane.
Figure 6A:
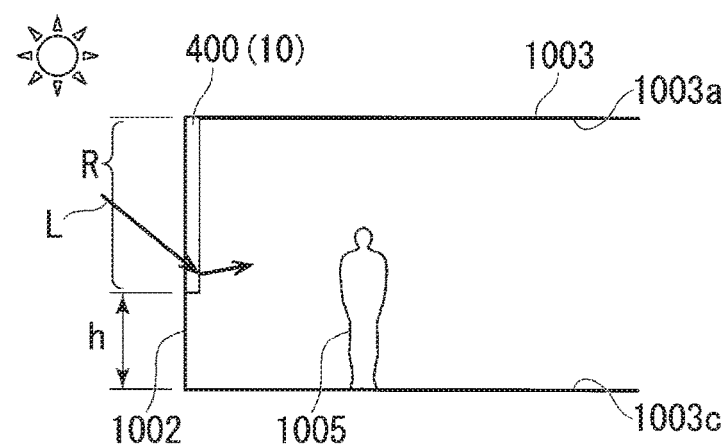
FIG. 6A is a diagram showing a room model in which a daylighting member of Comparative Example 2 (i.e. a daylighting member having the same function as the first daylighting section of the first embodiment) was installed in a predetermined region on the window pane.
Figure 7A:
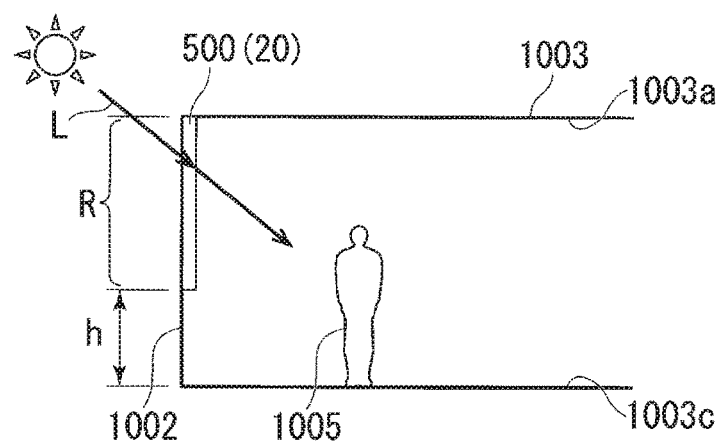
FIG. 7A is a diagram showing a room model in which a daylighting member of Comparative Example 3 (i.e. a daylighting member having the same function as a second daylighting section of the first embodiment) was installed in the installation region on the window pane.
Figure 8A:
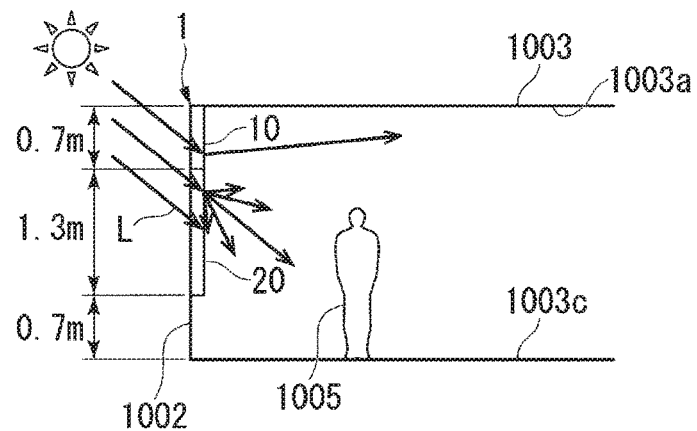
FIG. 8A is a diagram showing a room model in which the daylighting member of the first embodiment was installed on a window.

FIGS. 5A, 6A, and 7A show room models in which the daylighting members of Comparative Examples 1 to 3 were installed on windows, respectively, and FIG. 8A shows a room model in which the daylighting member of the present embodiment was installed on a window.

Figure 5B:
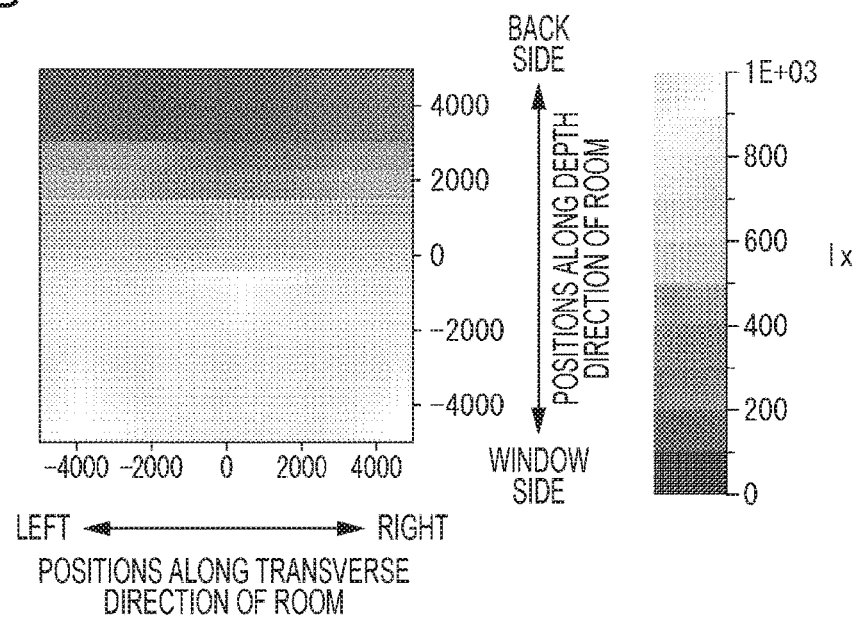
FIG. 5B is a contour figure showing the results of a ray-trace simulation of the daylighting member of Comparative Example 1.
Figure 6B:
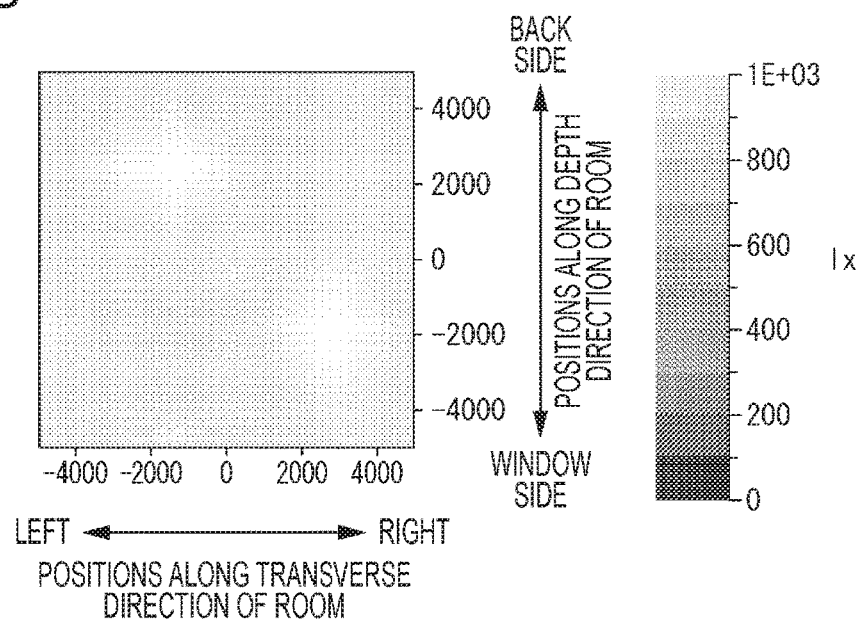
FIG. 6B is a contour figure showing the results of a ray-trace simulation of the daylighting member of Comparative Example 2.
Figure 7B:
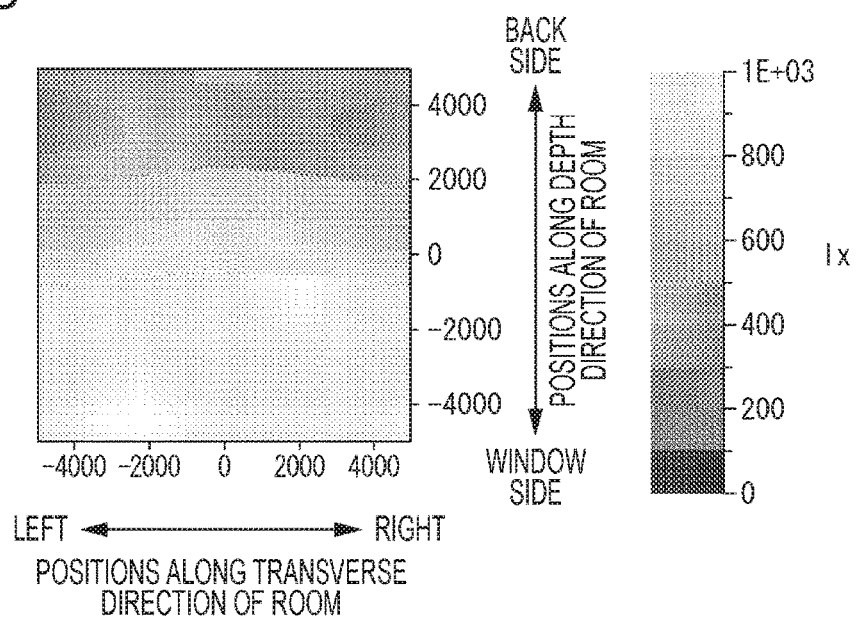
FIG. 7B is a contour figure showing the results of a ray-trace simulation of the daylighting member of Comparative Example 3.
Figure 8B:
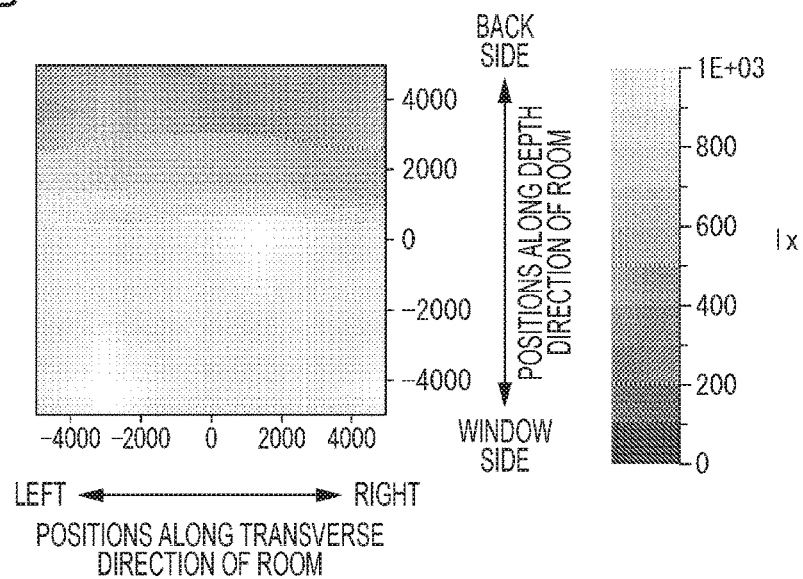
FIG. 8B is a contour figure showing the results of a ray-trace simulation of the daylighting member of the first embodiment.

Further, FIGS. 5B, 6B, and 7B show the results of ray-trace simulations of the daylighting members of Comparative Examples 1 to 3, respectively, and FIG. 8B shows the results of a ray-trance simulation of the daylighting member of the present embodiment. FIGS. 5B to 8B are each a contour figure of the illuminance of a working surface (illuminance of a desk top surface) located 0.85 m above the floor. The horizontal axis represents positions along a transverse direction of the room, and the vertical axis represents positions along a depth direction of the room, with a representation of the illuminance at each place.

COMPARATIVE EXAMPLE 1

FIG. 5A is a diagram showing a room model in which a daylighting member 300 of Comparative Example 1 (i.e. a daylighting member having the same function as the first daylighting section 10 of the present embodiment) was installed in an installation region r on the upper part of a window pane 1002. FIG. 5B is a contour figure showing the results of a ray-trace simulation of the daylighting member 300 of Comparative Example 1.

As shown in FIG. 5A, the daylighting member 300 is installed on the upper part (where the height h above the floor 1003c is 2.0 m) of the window pane 1002. Much of the light let in by the daylighting member 300 is emitted toward the ceiling 1003a near the window. Therefore, as shown in FIG. 5B, the illuminance becomes lower in absolute value toward the back of the room. That is, the daylighting member 300, which is installed on the upper part of the window pane 1002, cannot guide the light into the back of the room and therefore cannot increase the illuminance of the inside of the room over a wide range. That is, it is only at the expense of brightness that the person 1005 who is in the room can avoid feeling dazzled.

COMPARARTIVE EXAMPLE 2

FIG. 6A is a diagram showing a room model in which a daylighting member 400 of Comparative Example 2 (i.e. a daylighting member having the same function as the first daylighting section 10 of the present embodiment) was installed in a predetermined installation region R (where the height h above the floor 1003c is 0.7 m) on the window pane 1002. FIG. 6B is a contour figure showing the results of a ray-trace simulation of the daylighting member 400 of Comparative Example 3. Note here that the installation region R in which the daylighting member 400 was installed is wider than the installation region r in which the daylighting member 300 was installed.

As shown in FIG. 6A, light having entered through the window is refracted by the daylighting member 400 and emitted toward the ceiling 1003a inside the room. Therefore, as shown in FIG. 6B, the daylighting member 400 can guide much light into the back of the room and therefore improved the illuminance of the inside of the room.

However, the presence of the daylighting member 400 at the height of the eyes of the person 1005 causes a portion of the light emitted from a region on the lower part of the daylighting member 400 to travel toward the person 1005 and thus get directly into the eyes of the person 1005 who is in the room.

The indoor illuminance attributed to the daylighting member 400 is as high as several millions of candela per square meter ($cd/m^2$). In comparison with the room in which the daylighting member 300 of Comparative Example 1 was installed, the daylighting member 400 eliminates the difference in brightness and darkness along the depth direction of the inside of the room and achieves a substantial rise in brightness in the whole room. However, the light refracted by the daylighting member 400 turns into glare that easily gets into the eyes of the person 1005, who is near the window, thus causing the person 1005 to feel very dazzled.

COMPARATIVE EXAMPLE 3

FIG. 7A is a diagram showing a room model in which a daylighting member 500 of Comparative Example 3 (i.e. a daylighting member having the same function as the second daylighting section 20 of the present embodiment) was installed in the installation region R (where he height h from the floor 1003c is 0.7 m) on the window pane 1002. FIG. 7B is a contour figure showing the results of a ray-trace simulation of the daylighting member 500 of Comparative Example 2.

As shown in FIG. 7A, sunlight having entered through the window is isotropically diffused and emitted by the daylighting member 500. In comparison with the daylighting member 300 of Comparative Example 1, the daylighting member 500 is found, as shown in FIG. 7B, to guide the light into the back of the room, but the indoor illuminance attributed to the daylighting member 500 is 8000 $cd/m^2$, at which a person feels dazzled. That is, since the daylighting member 500 was installed in a wider region on the window pane 1002, much of the light is concentrated on the ceiling 1003a near the window, although there is an increase in brightness in the back of the room in comparison with the case shown in FIG. 5B where the daylighting member 300 of Comparative Example 1 was installed. This makes it easier for the glare to get into the eyes of the person 1005, who is approximately 2 m away from the window, thus causing the person 1005 to feel dazzled.

FIG. 8A is a diagram showing a room model in which the daylighting member 1 of the present embodiment was installed in the installation region R (where the height above the floor 1003c is 0.7 m) of the window pane 1002. FIG. 8B is a contour figure showing the results of a ray-trace simulation of the daylighting member 1 of the present embodiment.

As shown in FIG. 8A, a portion of light having entered through the window is let in by the daylighting member 1 of the present embodiment and emitted toward the ceiling 1003a of the room 1003, and the other portion of the light is emitted as scattered light toward the floor. That is, much of the light let in by the second daylighting section 20, which is present on the eye level (position of the eyes) of the person 1005 who is in the room, of the daylighting member 1 is emitted toward the floor 1003c. Even if there is light that travels toward the person 1005, the glare that gets directly into the eyes is so small in degree that the person 1005 does not feel dazzled. The illuminance attributed to the daylighting member 1 is such (3500 cd/m²) that the person 1005 who is in the room does not feel dazzled.

Thus, the daylighting member 1 of the present embodiment was able to increase brightness in the back of the room 1003 while suppressing the glare.

Further, as for the light transmittance and light diffusivity of the second daylighting section 20 of the daylighting member 1, the ray-trace simulation was conducted under such conditions that the angle of diffusion (FWHM) in a major direction of diffusion (horizontal direction) was 42 degrees and the transmittance of sunlight at an angle of incidence of 55 degrees was approximately 35%.

In a case where the transmittance of light passing through the second daylighting section 20 is high, there is undesirably an increase in glare, although an increase in amount of daylighting leads to an increase in brightness inside the room.

Further, in a case where the diffusivity of light in the second daylighting section 20 is strong, more components of light travel toward the ceiling to make it easier for the glare to get into the eyes of the person, although there is a decrease in peak luminance.

In a case where the diffusivity of light in the second daylighting section 20 is weak, there is neither light that reaches the ceiling nor a decrease in peak luminance.

For these reasons, the daylighting member 1 needs to be installed in an environment in which transmittance and diffusivity have been selected as appropriate according to the required amount of daylighting, the depth of the room, and the like.

Further, there may be a vertical tilt in the distribution of transmittance of light in the second daylighting section 20. For example, the second daylighting section 20 may be configured to exhibit such gradations of transmittance that the upper part of the second daylighting section 20 gives the same level of luminance as the first daylighting section 10 and the lower part of the second daylighting section 20 gives the same level of luminance as the wall.

[Second Embodiment]

The following describes a configuration of a daylighting member of a second embodiment.

Figure 9:
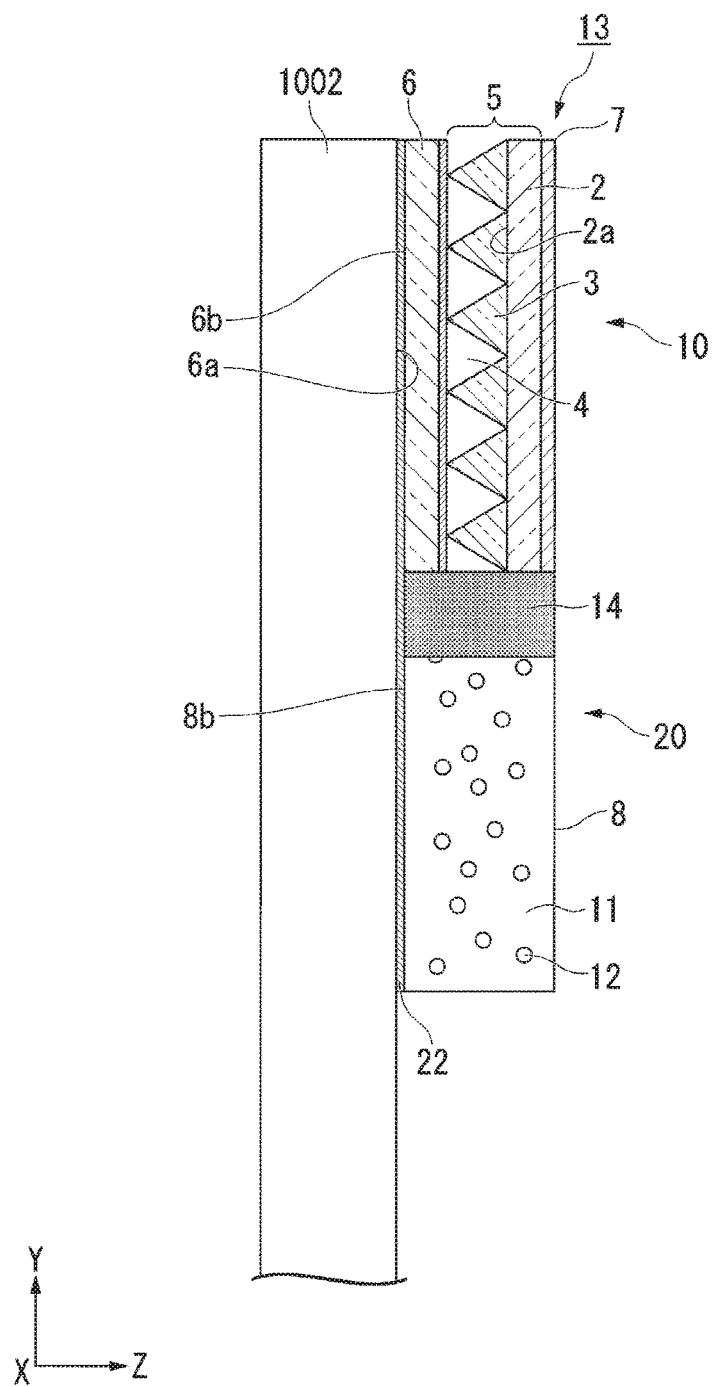
FIG. 9 is a cross-sectional view schematically showing a configuration of a daylighting member according to a second embodiment.
Figure 10:
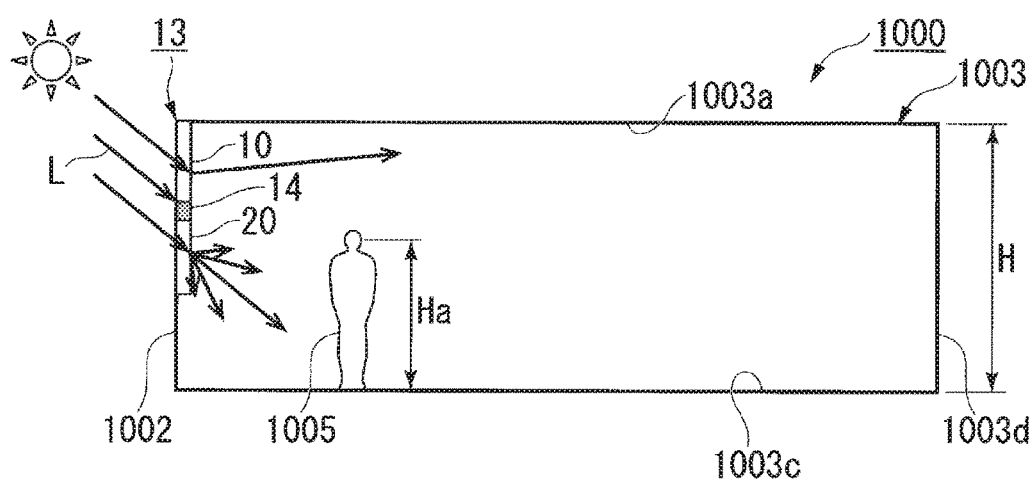
FIG. 10 is a diagram showing a room model in which the daylighting member of the second embodiment is installed on a window.

FIG. 9 is a cross-sectional view schematically showing the configuration of the daylighting member according to the second embodiment. FIG. 10 is a diagram showing a room model in which the daylighting member of the second embodiment is installed on a window.

As shown in FIG. 9, a daylighting member 13 includes a first daylighting section 10, a second daylighting section 20, and a light-blocking section (light amount adjusting section) 14. The light-blocking section 14 is provided between the first daylighting section 10 and the second daylighting section 20, which are placed side by side in a vertical direction. The light-blocking section 14 transmits a smaller amount of light than does each of the first and second daylighting sections 10 and 20.

As shown in FIG. 10, the light-blocking section 14 is located on or slightly above the eye level of a person 1005 who is in the room. For example, the presence of the second daylighting section 20 in a position level with the eyes of a person 1005 who is in a room with a high ceiling 1003a causes light transmitted by the second daylighting section 20 to turn into glare that easily gets into the eyes of the person 1005, thus causing the person 1005 to feel dazzled. Given these circumstances, the light-blocking section 14 is provided on the upper side of the second daylighting section 20 for the purpose of blocking direct light that gets into the eye of the person 1005 who is in the room. In the present embodiment, the light-blocking section 14 is present in a position corresponding to the height Ha of the eye level of the person 1005, e.g. at a height of 1.4 m to 1.7 m above the floor.

This allows the light-blocking section 14 to block the glare, so that the person 1005 who is in the room no longer feels dazzled.

It should be noted that the light-blocking section 14 may take any form as long as it transmits a smaller amount of light than does each of the first and second daylighting sections 10 and 20. For example, the light-blocking section 14 may be a light-reducing film that reduces the amount of transmitted light or be a light-diffusing film that is low in light transmittance.

[Third Embodiment]

The following describes a configuration of a daylighting member according to a third embodiment.

Figure 11:
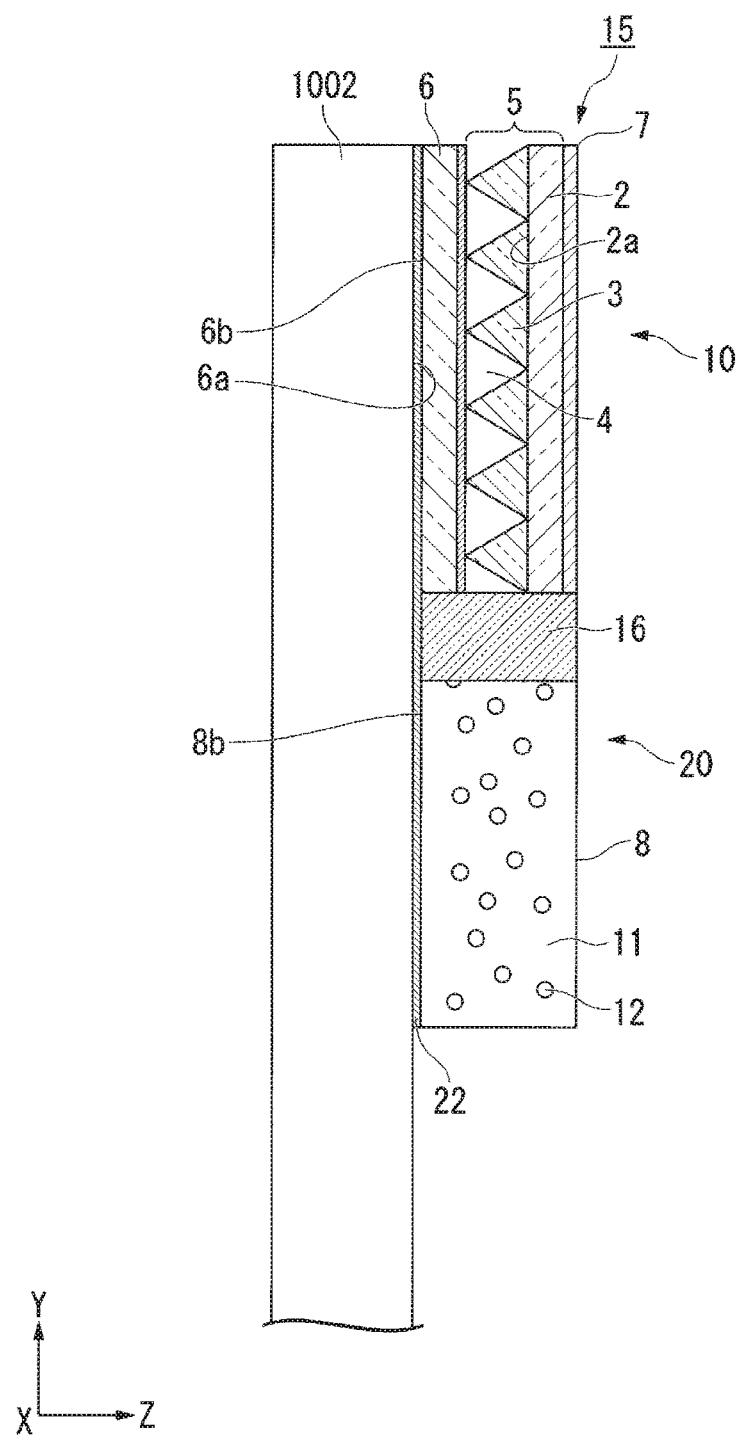
FIG. 11 is a diagram schematically showing a configuration of a daylighting member according to a third embodiment.
Figure 12:
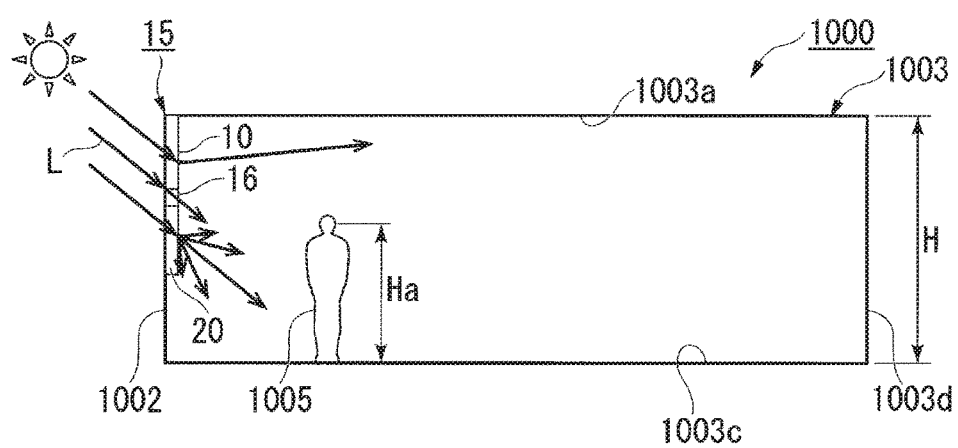
FIG. 12 is a diagram showing a room model in which the daylighting member of the third embodiment is installed on a window.

FIG. 11 is a diagram schematically showing the configuration of the daylighting member according to the third embodiment. FIG. 12 is a diagram showing a room model in which the daylighting member of the third embodiment is installed on a window.

As shown in FIG. 11, a daylighting member 15 includes a first daylighting section 10, a second daylighting section 20, and a transparent section (transparent member) 16.

The transparent section 16 is disposed between the first daylighting section 10 and the second daylighting section 20, which are placed side by side in a vertical direction. The transparent section 16 has a function of transmitting light in a state where an angle of incidence of the incoming light and an angle of emission of outgoing light are substantially equal. The transparent section 16 is constituted by an optically transparent substrate such as a glass substrate or a resin substrate.

As in the embodiment described above, as shown in FIG. 12, the transparent section 16 is present in a position corresponding to the height Ha of the eye level of the person 1005, e.g. at a height of 1.4 m to 1.7 m above the floor 1003c.

Light L having entered the transparent section 16 of the daylighting member 15 at a predetermined angle is emitted at the same angle and travels toward the floor 1003c. Therefore, the person 1005 who is in the room hardly feels dazzled.

Further, the presence of the transparent section 16 in substantially the same position as the height of the eye level of the person 1005 makes it easier to see through the daylighting member 15. That is, the possibility of looking out of the window through the transparent section 16 gives a better impression of the indoor space.

Furthermore, in a case where a blind is installed on the indoor side of the window pane, looking out of the window requires creating clearance by drawing up the blind or by pressing down some of the slats, which are arranged one above the other, by hand.

However, there has been concern that it takes time or requires much labor to draw up the blind in each case of looking out of the window or that damage or the like may be done to the slats. By being provided with the transparent section 16 in advance, the daylighting member 15 of the present embodiment makes it possible to freely look out of the window.

[Fourth Embodiment]

The following schematically describes a configuration of a daylighting member according to a fourth embodiment.

Figure 13:
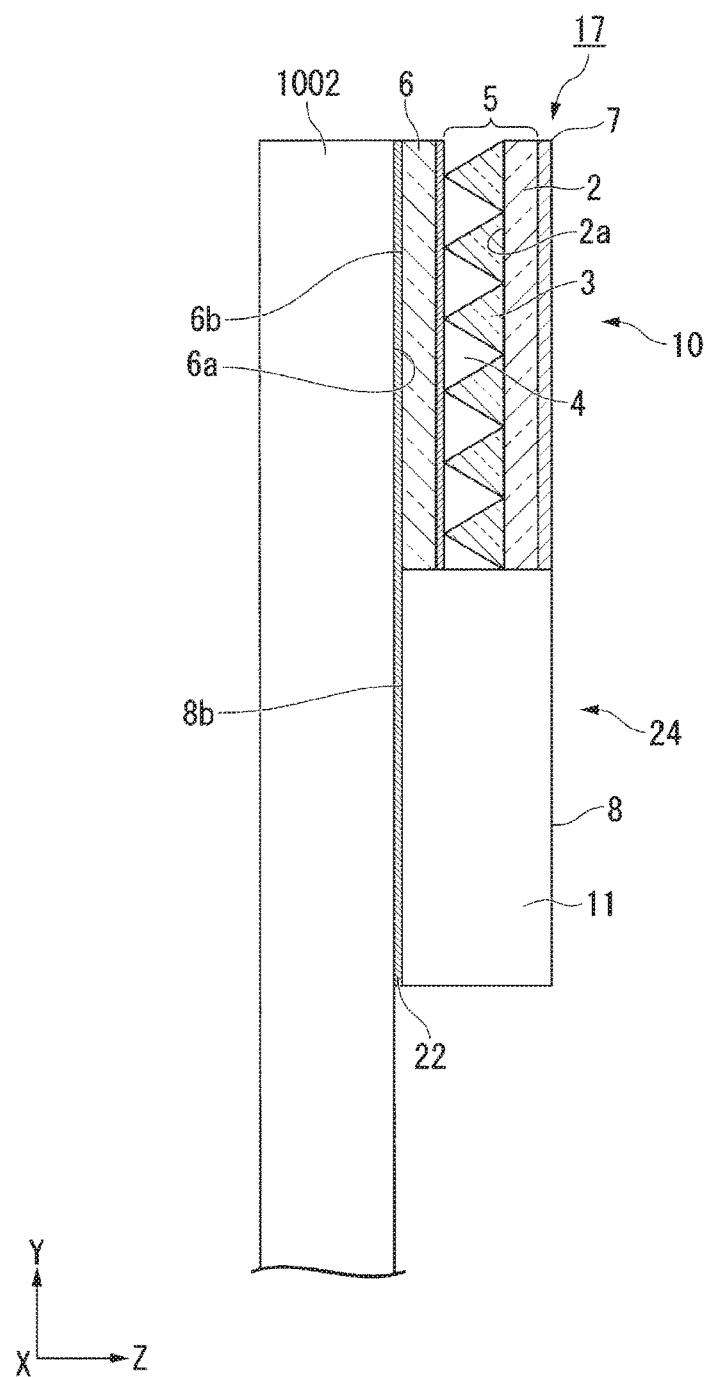
FIG. 13 is a diagram schematically showing a configuration of a daylighting member according to a fourth embodiment.
Figure 14:
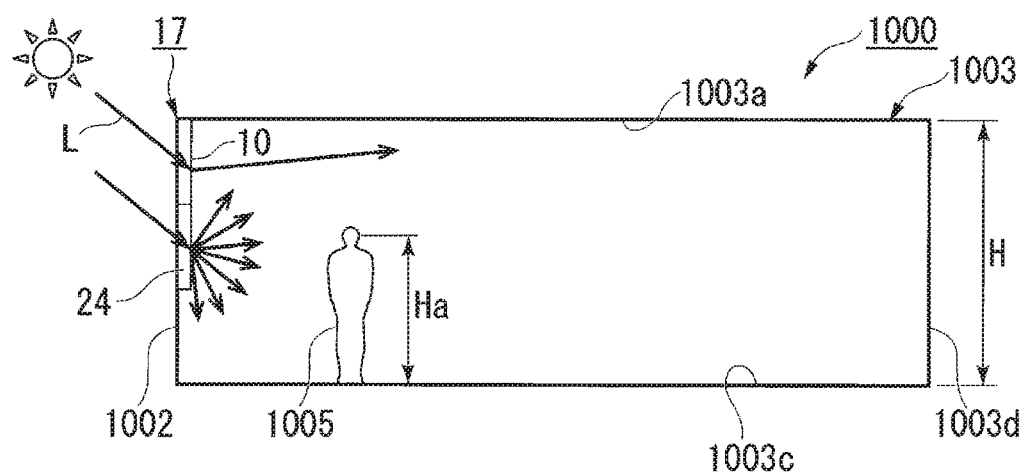
FIG. 14 is a diagram showing a room model in which the daylighting member of the fourth embodiment is installed on a window.

FIG. 13 is a diagram schematically showing the configuration of the daylighting member according to the fourth embodiment. FIG. 14 is a diagram showing a room model in which the daylighting member of the fourth embodiment is installed on a window.

As shown in FIG. 13, a daylighting member 17 includes a first daylighting section 10 and a second daylighting section 24. In the present embodiment, the second daylighting section 24 is a film made of a luminescence material, such as a fluorescent film or a luminous (phosphorescent) film.

In a case where the second daylighting section 24 is a luminous film or a phosphorescent film, its fluorescence is emitted with sunlight serving as excitation light. For this reason, the daylighting member 17 has a luminance distribution that does not depend on the solar altitude (angle of incidence), and the luminance reaches its highest value in a direction normal to the daylighting member 17 shown in FIG. 14. This makes it easier for light to get to the eye level of the person 1005 who is in the room, although the second daylighting section 24 is large in degree of light diffusion. This makes it necessary to adjust the amount of emission of light from the second daylighting section 24 to such a degree that the person 1005 who is in the room does not feel dazzled.

In a case where the second daylighting section 24 contains a fluorescent material in the daylighting member 17 of the present embodiment, design qualities can be imparted, as fluorescent materials of various colors have been developed. Alternatively, in a case where the second daylighting section 24 contains a phosphorescent material (glow-in-the-dark material), the second daylighting section 24 can serve as a mark, for example, in case of power outage or the like. The placement of emergency supplies such as a flashlight by the window makes it possible to find the flashlight by using the light from the second daylighting section 24 as a mark, thus making it possible to take appropriate action even in case of power outage.

[Fifth Embodiment]

The following schematically describes a configuration of a daylighting member according to a fifth embodiment.

Figure 15:
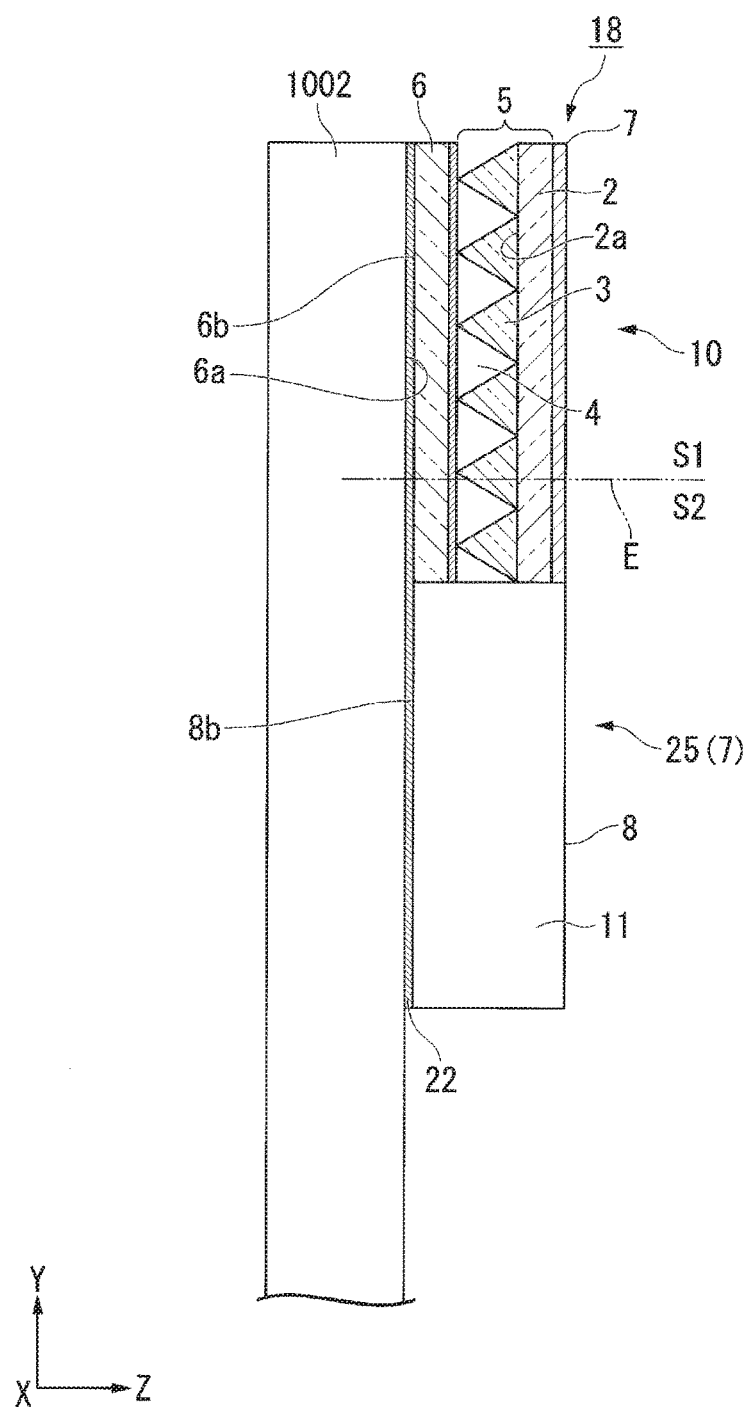
FIG. 15 is a diagram schematically showing a configuration of a daylighting member according to a fifth embodiment.
Figure 16:
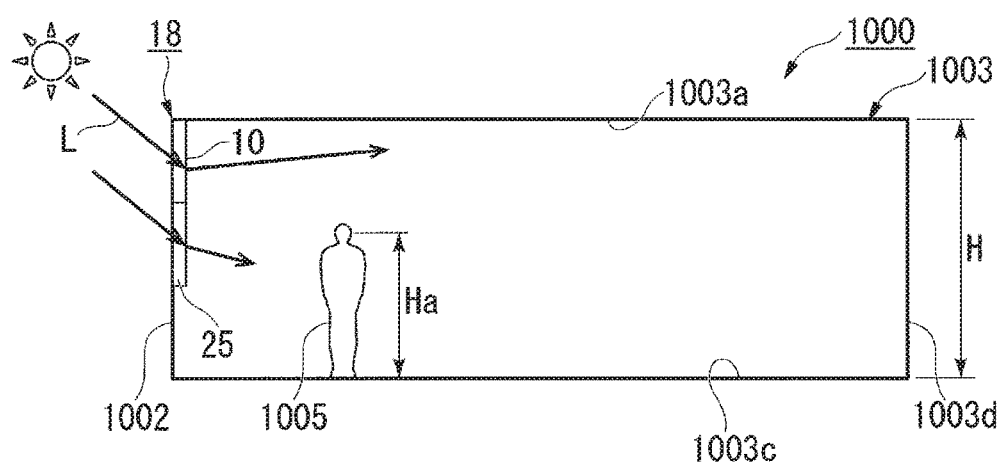
FIG. 16 is a diagram showing a room model in which the daylighting member of the fifth embodiment is installed on a window.

FIG. 15 is a diagram schematically showing the configuration of the daylighting member according to the fifth embodiment. FIG. 16 is a diagram showing a room model in which the daylighting member of the fifth embodiment is installed on a window.

As shown in FIGS. 15 and 16, a daylighting member 18 includes a first daylighting section 10 and a second daylighting section 25. In the present embodiment, the second daylighting section 25 is anisotropic in direction of diffusion of light and has a property of diffusing light more strongly in the direction (horizontal direction) in which in the plurality of daylighting portions 3 of the first daylighting section 10 extend than in a direction intersecting the direction in which these daylighting portions 3 extend. That is, the second daylighting section 25 diffuses light more strongly in a direction parallel to a direction intersecting the direction of placement of the two spaces S1 and S2 bordering across the virtual plane E perpendicular to the first surface 2a and parallel to the direction in which the daylighting portion 3 extends than in the direction of placement. This makes it possible to, by causing the second daylighting section 25 to diffuse light more strongly in the horizontal direction (X direction) than in the vertical direction (Y direction), let in light while decreasing the luminance of direct light.

As the second daylighting section 25, the anisotropic light-diffusing sheet 7 constituted by a lenticular lens may be employed, for example. It should be noted that, without being limited to a lenticular lens, the second daylighting section 25 needs only be configured to be anisotropic in diffusivity of light and able to specifically diffuse light in the direction (X direction) in which the daylighting portions 3 extend.

The diffusivity of light is smaller than in such a case as that of a previous embodiment where light is isotropically scattered. Therefore, if needed, an ND filter (light amount adjusting filter) may be disposed on the optical incidence side of the second daylighting section 25 to reduce light to such a degree that the person 1005 who is in the room does not feel dazzled.

[Daylighting Apparatus of First Embodiment] (Detachable Type)

Figure 17:
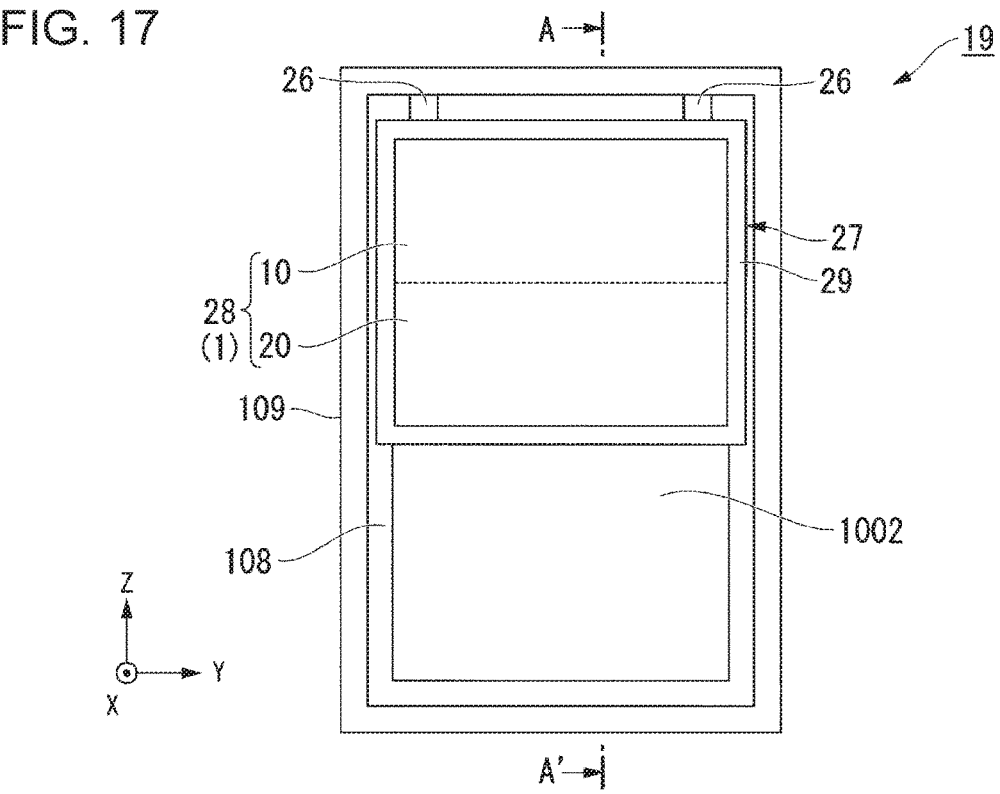
FIG. 17 is a front view showing the appearance of a daylighting apparatus of the first embodiment.
Figure 18:
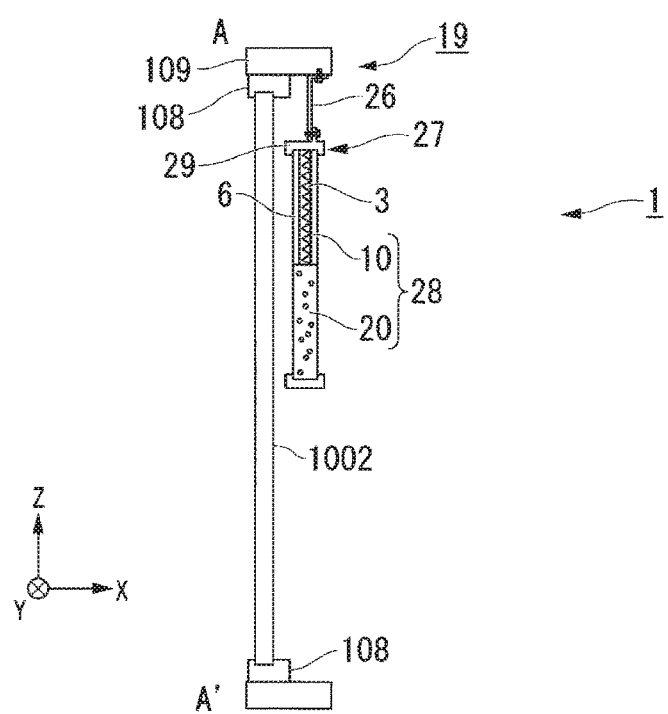
FIG. 18 is a cross-sectional view taken along line A-A' in FIG. 17.

The following describes, as an example of a daylighting apparatus according to the first embodiment of the present invention, a detachable daylighting apparatus 19 shown in FIGS. 17 and 18. FIG. 17 is a front view showing the appearance of the daylighting apparatus of the first embodiment as installed on a window. FIG. 18 is a cross-sectional view taken along line A-A' in FIG. 17.

As shown in FIGS. 17 and 18, the daylighting apparatus 19 includes a daylighting unit 27 and a plurality of fitting sections 26 for detachably fitting the daylighting unit 27 in a window frame (object of installation) 109. The daylighting unit 27 includes a daylighting sheet (daylighting member) 28 and a frame 29 that supports the daylighting sheet 28.

The daylighting sheet 28 may be a daylighting member according to any of the embodiments described above. The daylighting member 1 according to the first embodiment is used here as an example of the daylighting sheet 28. The daylighting sheet 28 constituted by the daylighting member 1 includes the first daylighting section 10 and the second daylighting section 20. It should be noted that, in the present embodiment, the second adhesive layer 22 for sticking the daylighting member 1 to the window pane 1002 is unnecessary and, as such, is excluded from the configuration.

The frame 29 is constituted by a frame body made of aluminum and serves to hold the daylighting sheet 28 in a flat state in such a way as to surround the daylighting sheet 28.

The daylighting unit 27 thus configured is installed in such a way as to be hung from the upper part of the window frame 109 by the pair of fitting sections 26. In a state where the daylighting unit 27 is fitted, the bonding substrate 6 (microstructural surface of the daylighting sheet 28) side of the daylighting sheet 28 is positioned to face the window pane 1002. In FIGS. 17 and 18, reference numerals 1002, 108, and 109 denote "window pane", "window sash", and "window frame", respectively.

The daylighting apparatus 19 according to the present embodiment includes the fitting sections 26 and the daylighting unit 27, and the daylighting unit 27 is attached to the window frame 109 (window pane 1002) via the fitting sections 26. This structures the daylighting apparatus 19 to be detachable from a window. This makes it possible to attach or remove the daylighting apparatus 19 to or from the window pane 1002 more easily than a conventional daylighting apparatus that is directly bonded to the window pane 1002. This makes it possible, for example, to efficiently do maintenance work and replace daylighting units 27.

[Daylighting Apparatus of Second Embodiment] (Hybrid Mechanism)

Figure 19:
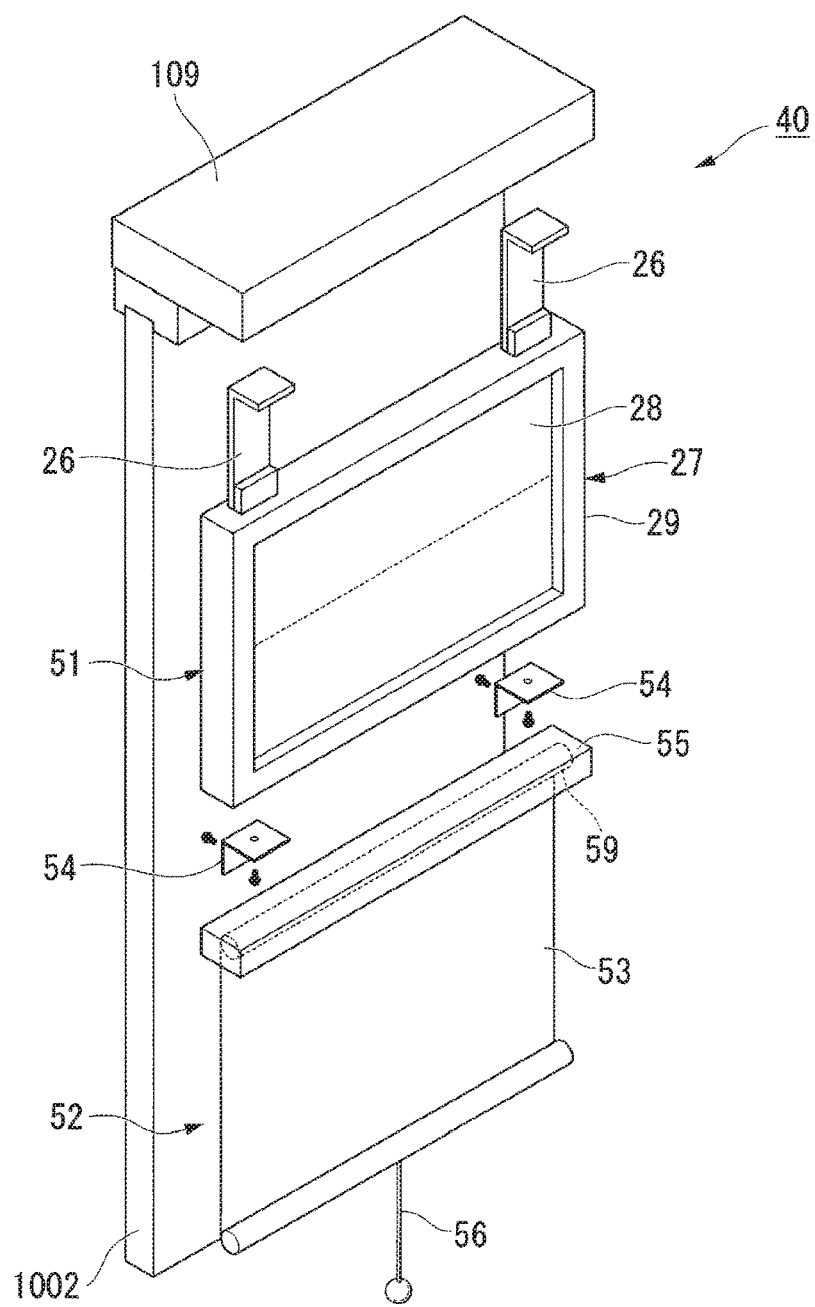
FIG. 19 is a perspective view schematically showing a configuration of a daylighting apparatus of the second embodiment.

The following describes, as an example of a daylighting apparatus according to the second embodiment of the present invention, a daylighting apparatus 40 shown in FIG. 19.

As shown in FIG. 19, the daylighting apparatus 40 includes a daylighting mechanism 51 and a light-blocking mechanism 52 connected to the lower end of the daylighting mechanism 51. The daylighting mechanism 51 includes a daylighting unit 27 and a pair of fitting sections 26 that are described in the previous embodiment. The light-blocking mechanism 52 is a so-called light-blocking roll screen and includes a light-blocking screen 53, a winding mechanism 55 that windably supports the light-blocking screen 53, and a pair of connecting sections 54 for fixing the light-blocking screen 53 supported by the winding mechanism 55 to the first daylighting mechanism 51.

The winding mechanism 55 is of a pull-cord type that makes it possible to pull down the light-blocking screen 53 to a position and hold the light-blocking screen 53 in the position and to, by further pulling a pull cord 56 starting from the position to which the light-blocking screen 53 has been pulled down, stop holding the light-blocking screen 53 and automatically wind the light-blocking screen 53 around a winding core 59. It should be noted that, without being limited to such a pull-cord type, the winding mechanism 55 may be a chain type of winding mechanism that rotates the winding core 59 with a chain or an automatic winding type of winding mechanism that rotates the winding core 59 with a motor.

For example, in a case where the window pane 1002 occupies the whole wall surface of the room, installing a daylighting apparatus such as that described in the previous embodiment in the window frame causes a part of the window that is close to the floor to be in an open state.

The daylighting apparatus 40 of the present embodiment corresponds in size to the whole surface of the window pane 1002 and, by connecting the light-blocking mechanism 52 below the daylighting mechanism 51, can ensure a light-blocking effect against a part of the window pane that is close to the floor. This makes it possible to, while protecting privacy inside the room, achieve a lighted environment inside the room through the daylighting function on the side of the daylighting mechanism 51.

Figure 20:
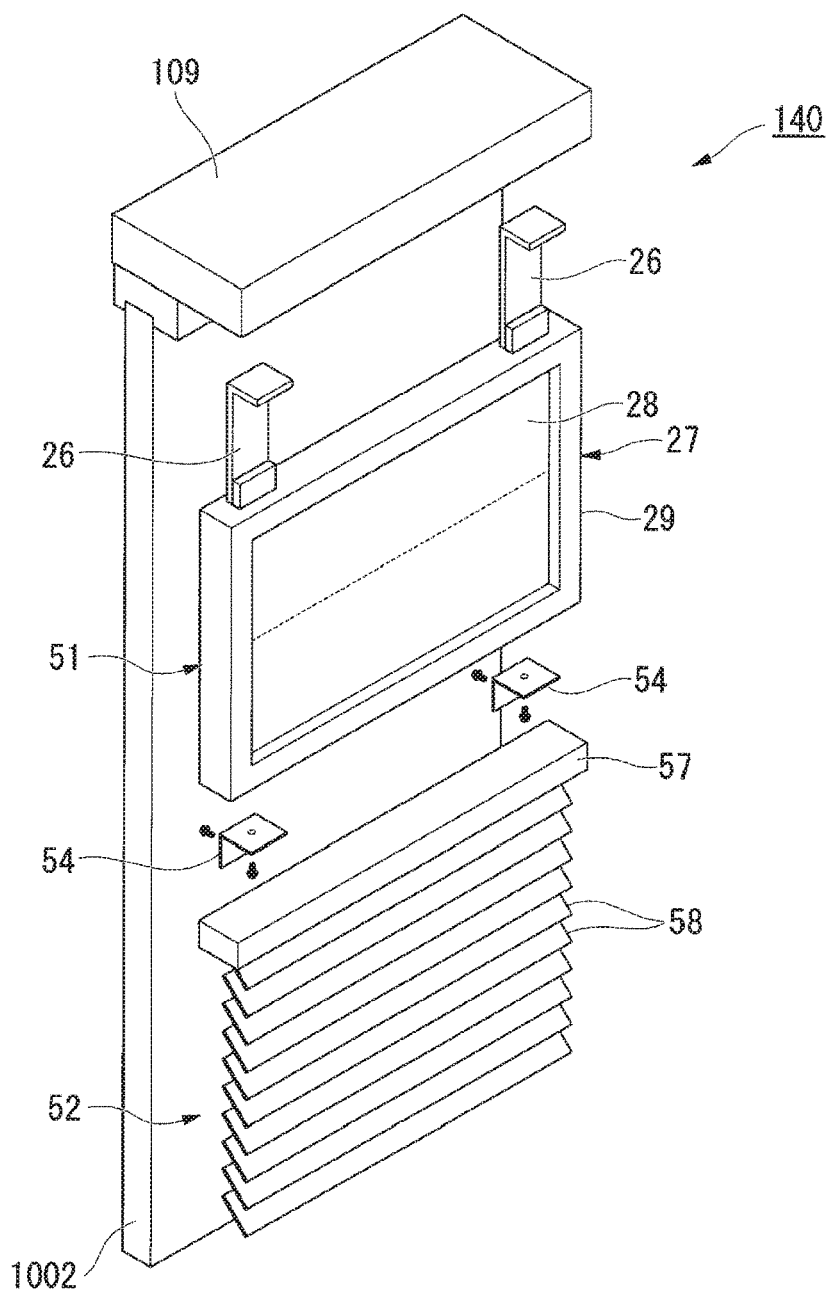
FIG. 20 is a perspective view showing a modification of the daylighting apparatus of the second embodiment.

It should be noted that the light-blocking mechanism 52 is not limited in configuration to a roll screen. For example, as shown in FIG. 20, the light-blocking mechanism 52 may be a blind including a plurality of light-blocking slats 58 and a storage box 57 in which these light-blocking slats 58 are stowed.

[Daylighting Apparatus of Third Embodiment] (Roll Screen)

Figure 21:
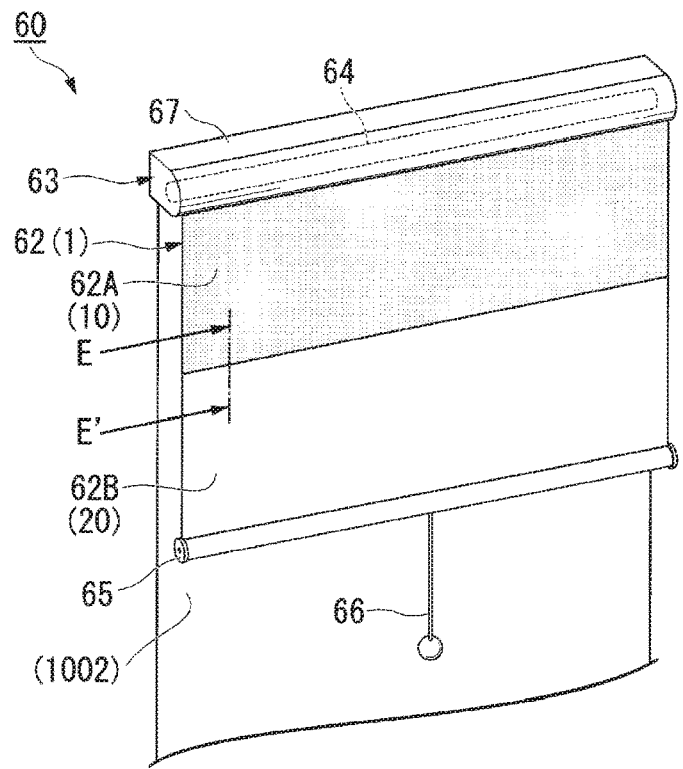
FIG. 21 is a perspective view showing the appearance of a roll screen serving as an example of a daylighting apparatus of the third embodiment.
Figure 22:
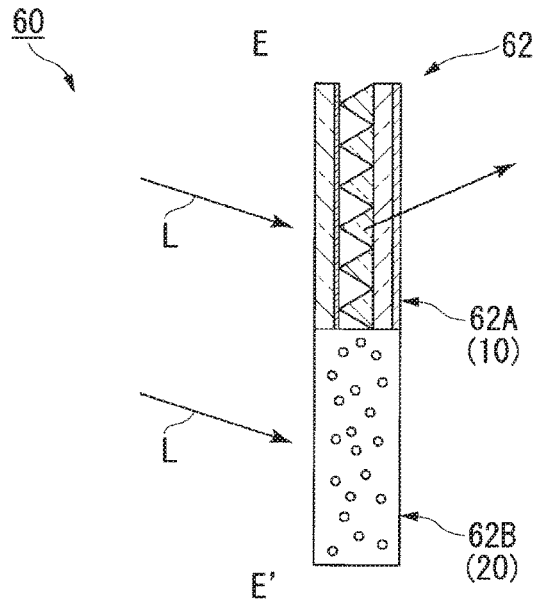
FIG. 22 is a cross-sectional view taken along line E-E' in FIG. 21.

The following describes, as an example of a daylighting apparatus according to the third embodiment of the present invention, a roll screen 60 shown in FIGS. 21 and 22. FIG. 21 is a perspective view showing the appearance of the roll screen 60 as installed on a window. FIG. 22 is a cross-sectional view taken along line E-E' in FIG. 21. Further, in the following description, those components which are the same as those of the daylighting member are not described and given the same reference numerals in the drawings.

As shown in FIG. 21, the roll screen 60 includes a daylighting screen 62 and a winding mechanism 63 that windably supports the daylighting screen 62.

The daylighting screen 62 includes a first screen 62A and a second screen 62B located below the first screen 62A and having different daylighting properties from the first screen 62A.

The daylighting screen 62 may be a daylighting member according to any of the embodiments described above. The daylighting member 1 according to the first embodiment is used as an example of the daylighting screen 62. It should be noted that, in the present embodiment, the second adhesive layer 22 for sticking the daylighting screen 62 to the window pane 1002 is unnecessary and, as such, is excluded from the configuration.

Specifically, the first screen 62A of the daylighting screen 62 is constituted by a sheeted first daylighting section 10, and the second screen 62B is constituted by a sheeted second daylighting section 20. The first daylighting section 10 and the second daylighting section 20 have appropriate thicknesses for the daylighting screen 62.

The winding mechanism 63 includes a winding core 64 attached to and extending along the upper edge of the daylighting screen 62, a lower pipe 65 attached to and extending along the lower edge of the daylighting screen 62, a pull cord 66 attached to the center of the lower edge of the daylighting screen 62, and a storage case 67 in which the daylighting screen 62 is stowed by being wound around the winding core 64.

The winding mechanism 63 is of a pull-cord type that makes it possible to pull down the daylighting screen 62 to a position and hold the daylighting screen 62 in the position and to, by further pulling the pull cord 66 starting from the position to which the daylighting screen 62 has been pulled down, stop holding the daylighting screen 62 and automatically wind the daylighting screen 62 around the winding core 64.

It should be noted that, without being limited to such a pull-cord type, the winding mechanism 63 may be a chain type of winding mechanism that rotates the winding core 64 with a chain or an automatic winding type of winding mechanism that rotates the winding core 64 with a motor.

The roll screen 60 thus configured is used with the storage case 67 fixed to the upper part of the window pane 1002 and with the daylighting screen 62 facing the inner surface of the window pane 1002 while being pulled down out of the storage case 67 with a pull cord 406.

In the case of a state where the daylighting screen 62 has been wholly pulled down, the first screen 62A changes the traveling direction of light L falling on one surface of the daylighting screen 62 diagonally from above and, at the same time, aims the light at the ceiling inside the room. Meanwhile, the second screen 62B isotropically diffuses and emits the light L falling on one surface of the daylighting screen 62 diagonally from above. Since the second screen 62B is located below the first screen 62A, a portion of the light L having entered the room through the window pane 1002 that turns mainly into glare or travels toward the floor can be diffused so that a person who is in the room does not feel dazzled.

As described above, the roll screen 60 can switch the characteristics of the daylighting function on an as-needed basis by winding or unwinding the daylighting screen 62 with the winding mechanism 63.

[Daylighting Apparatus of Fourth Embodiment] (Blind)

The following describes, as an example of a daylighting apparatus according to the fourth embodiment of the present invention, a blind 30 shown in FIGS. 23 to 25B.

Figure 23:
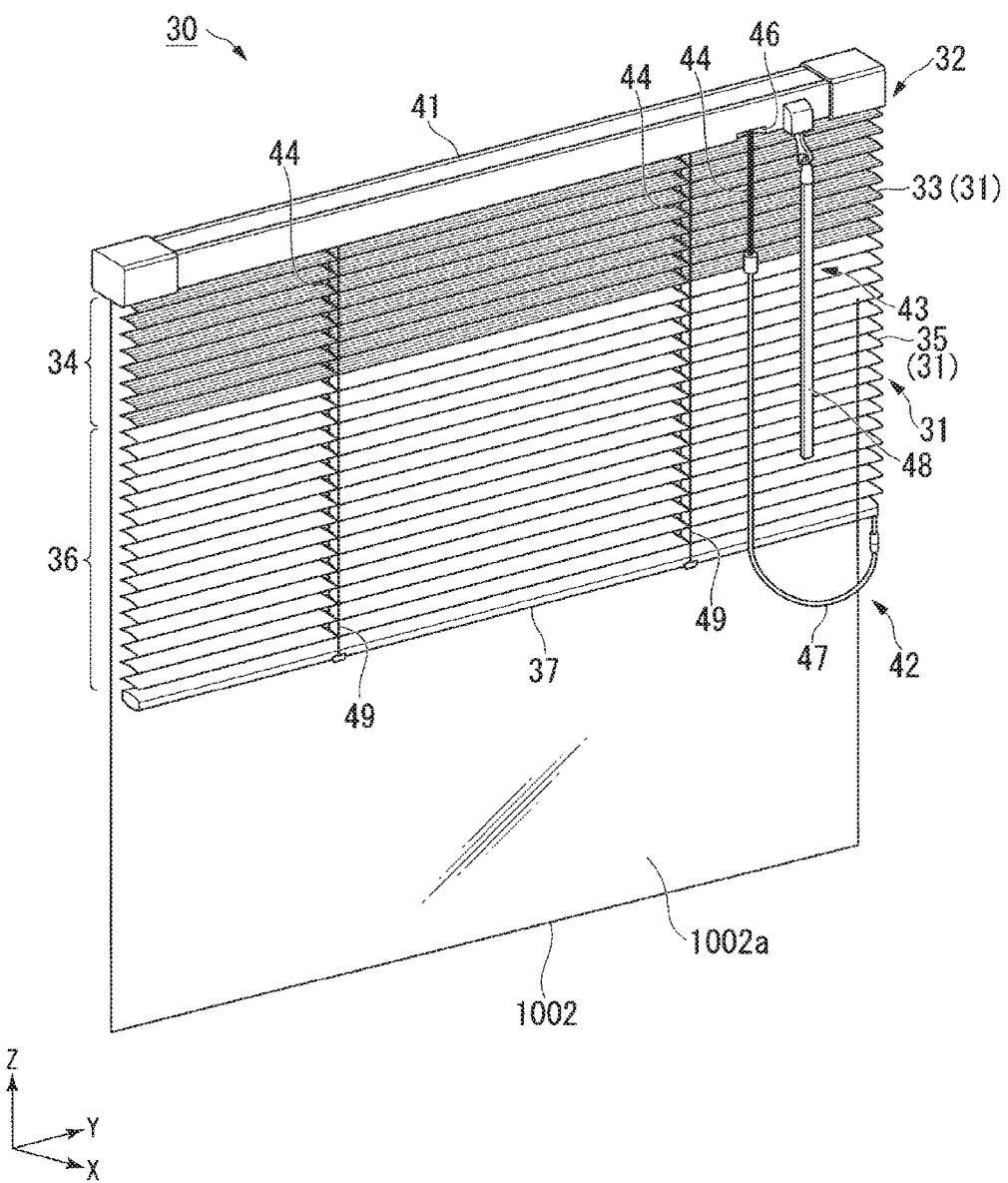
FIG. 23 is a perspective view showing a configuration of a blind according to a daylighting apparatus of the fourth embodiment.
Figure 24:
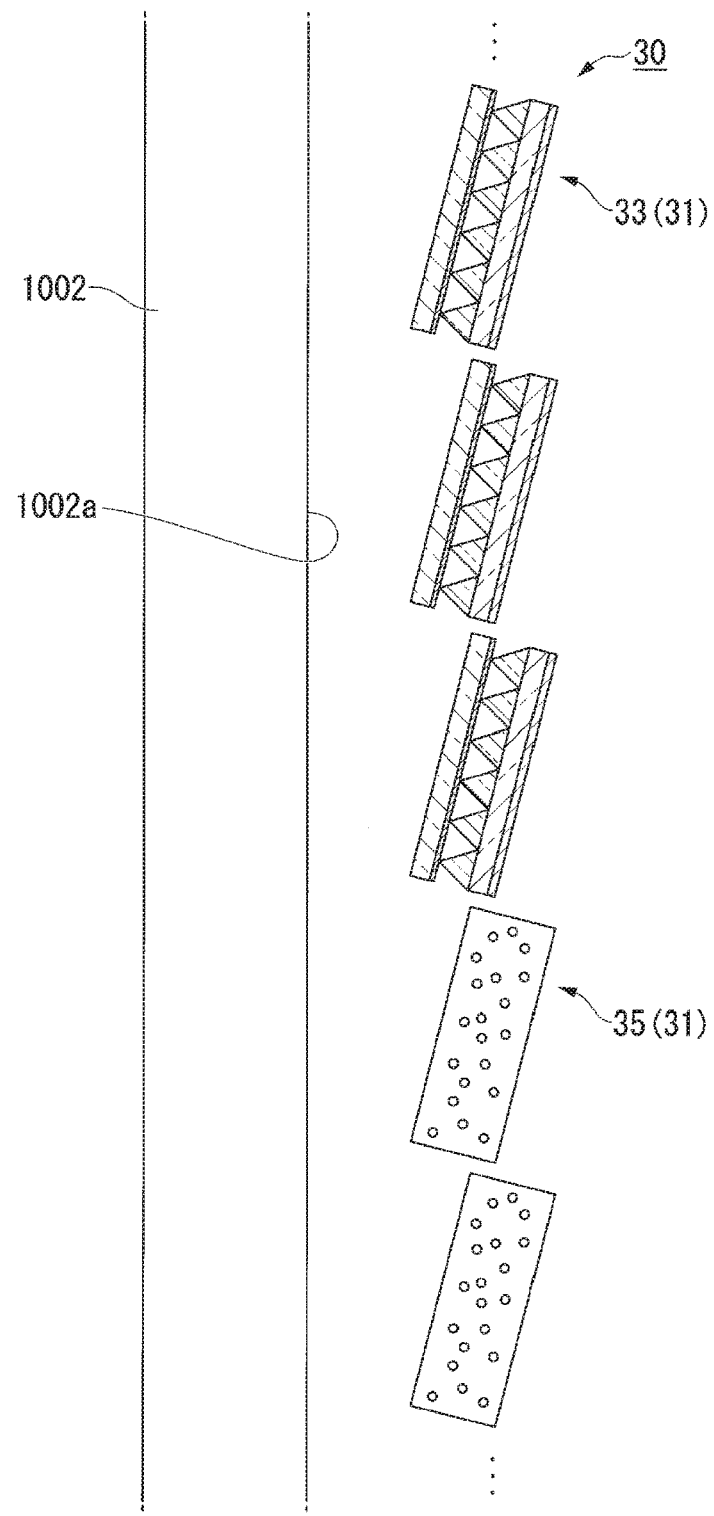
FIG. 24 is a cross-sectional view showing the configuration of the blind according to the daylighting apparatus of the fourth embodiment.

FIG. 23 is a perspective view showing a configuration of a blind according to the daylighting apparatus of the fourth embodiment. FIG. 24 is a cross-sectional view showing the configuration of the blind according to the daylight apparatus of the fourth embodiment.

As shown in FIG. 23, the blind (daylighting apparatus) 30 includes a plurality of slats 31 extending in a horizontal direction and arranged parallel to one another at predetermined intervals and a supporting mechanism 32 that supports the plurality of slats 31 in such a way that the plurality of slats 31 can be freely hung in a vertical direction. The blind 30 supports the plurality of slats 31 in such a way that the plurality of slats 31 can be freely pulled up and down and freely tilted.

The plurality of slats 31 have a first daylighting section (first region) 34 and a first daylighting section (second region) 36. The first daylighting section 34 includes a plurality of first slats 33 having daylighting properties. The second daylighting section 36 includes a plurality of second slats 35 having light diffusion properties. It should be noted that the first slats 33 and the second slats 35 are hereinafter referred to collectively as "slats 31" when they are not particularly differentiated from each other.

In the present embodiment, as shown in FIG. 24, each of the first slats 33 is the first daylighting section 10 of a daylighting member according to any of the embodiments described above. Further, each of the second slats 35 is the second daylighting section 20, 24, or 25 of a daylighting member according to any of the embodiments described above. Note, however, that the first daylighting section 10 and the second daylighting section (20, 24, 25) have appropriate thicknesses for the slats 31.

Figure 25A:
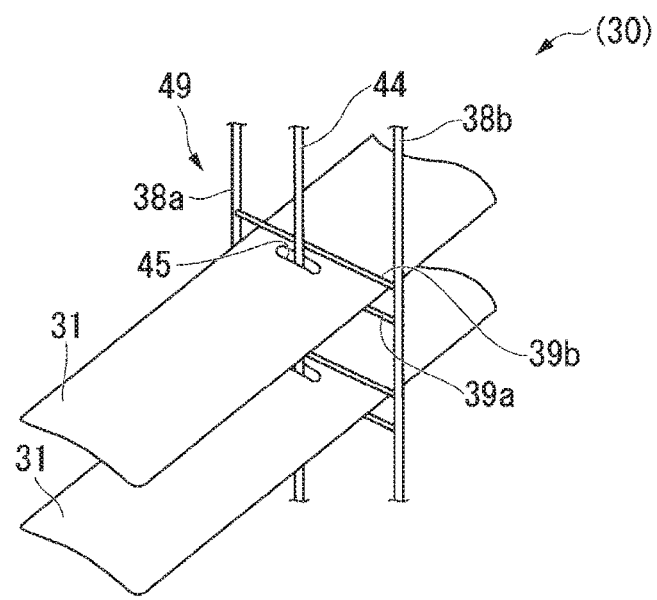
FIG. 25A is a first enlarged perspective view of the main components of the blind.
Figure 25B:
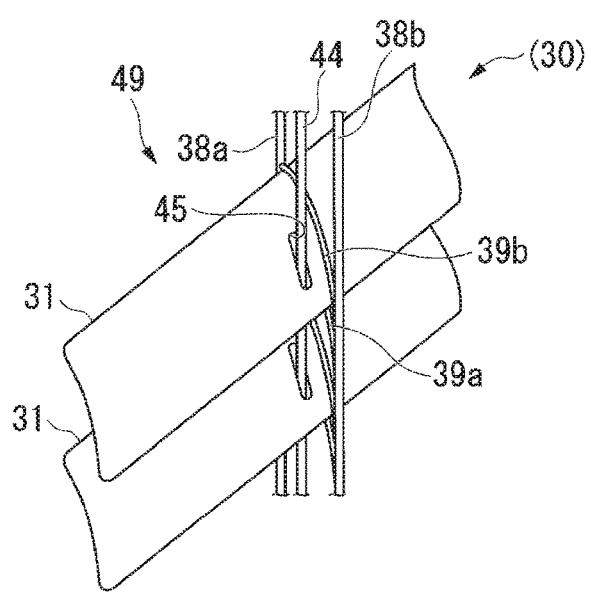
FIG. 25B is a second enlarged perspective view of the main components of the blind.

FIGS. 25A and 25B are enlarged perspective views of the main components of the blind 30. FIG. 25A shows a state in which the slats 31 are open, and FIG. 25B shows a state where the slats 31 are closed.

A pair of ladder cords 49 are lined up side by side on the right and left sides, respectively, of the central part of the plurality of slats 31. As shown in FIGS. 25A and 25B, each of the ladder cords 49 includes a pair of front and rear vertical cords 38a and 38b arranged parallel to each other and pairs of upper and lower horizontal cords 39a and 39b bridging between the vertical cords 38a and 38b, and is configured such that the horizontal cords 39a and 39b are placed side by side at regular intervals in a longitudinal direction (vertical direction) of the vertical cords 38a and 38b. The slats 31 are arranged in such a state that each of the slats 31 is inserted in a space surrounded by the vertical cords 38a and 38b, the corresponding one of the horizontal cords 39a, and the corresponding one of the horizontal cords 39b.

As shown in FIG. 23, a fixed box 41 is located in the uppermost part of the plurality of slats 31 arranged parallel to one another, and is placed parallel to the plurality of slats 31. Meanwhile, an up-and-down bar 37 is located in the lowermost part of the plurality of slats 31 arranged parallel to one another, and is placed parallel to the plurality of slats 31. The vertical cords 38a and 38b (FIGS. 25A and 25B) of each of the ladder cords 49 are hung from the fixed box 41 in such a state as to be stretched downward in a vertical direction by the weight of the up-and-down bar 37.

The supporting mechanism 32 includes a pull-up and pull-down operation section 42 for performing an operation of pulling up and down the plurality of slats 31 and a tilting operation section (titling mechanism) 43 for performing an operation of tilting the plurality of slats 31.

As shown in FIGS. 23, 25A, and 25B, the pull-up and pull-down operation section 42 includes a plurality of pull-up and pull-down cords 44. The plurality of pull-up and pull-down cords 44 are arranged parallel to the vertical cords 38a and 38b of each of the ladder cords 49. Further, the plurality of pull-up and pull-down cords 44 have their lower ends attached to the up-and-down bar 37 through holes 45 formed in the respective slats 31.

Further, the plurality of pull-up and pull-down cords 44 have their upper ends routed through the fixed box 41 and drawn out through a window portion 46 provided on one side of the fixed box 41. The pull-up and pull-down cords 44 thus drawn out through the window portion 46 is coupled to one end of an operating cord 47. The other end of the operating cord 47 is attached to one end of the up-and-down bar 37.

In the pull-up and pull-down operation section 42, by pulling the operating cord 47 with the up-and-down bar 37 in its lowermost position, the pull-up and pull-down cords 44 are drawn into the fixed box 41. This causes the plurality of slats 31 to rise together with the up-and-down bar 37 while overlapping the up-and-down bar 37 in order from the bottom. The pull-up and pull-down cords 44 are fixed by a stopper (not illustrated) provided inside the window portion 46. This allows the up-and-down bar 37 to be fixed at a given height. On the other hand, by causing the stopper to stop fixing the pull-up and pull-down cords 44, the up-and-down bar 37 can be lowered by its own weight. This allows the up-and-down bar 37 to return to its lowermost position.

As shown in FIG. 23, the tilting operation section 43 includes an operating lever 48 on one side of the fixed box 41. The operating lever 48 is attached in such a way as to be able to freely rotate about an axis. The tilting operation section 43 allows an operation of moving the vertical cords 38a and 38b of the ladder cords 49 upward and downward in directions opposite to each other by rotating the operating lever 48 about the axis. This allows the plurality of slats 31 to tilt in synchronization with one another between the state shown in FIG. 25A where the slats 31 are open and the state shown in FIG. 25B where the slats 31 are closed.

The blind 30 thus configured is disposed to be hung from the upper part of the window frame with the plurality of slats 31 facing an inner surface 1002a of the window pane 1002.

[Illumination Lighting Control System]

Figure 26:
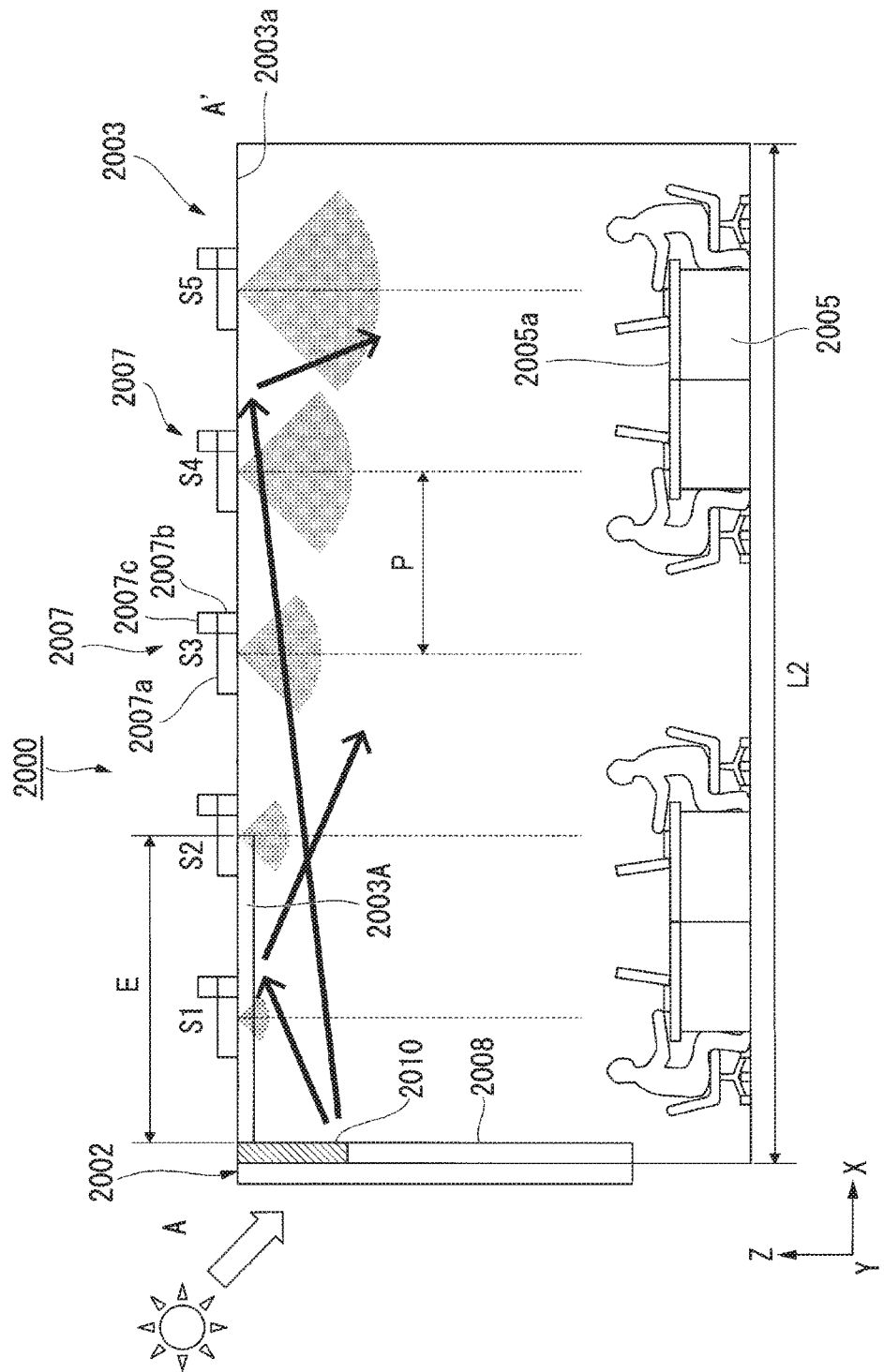
FIG. 26 is a cross-sectional view taken along line A-A' in FIG. 27 of a room model including a daylighting apparatus and an illumination lighting control system.
Figure 27:
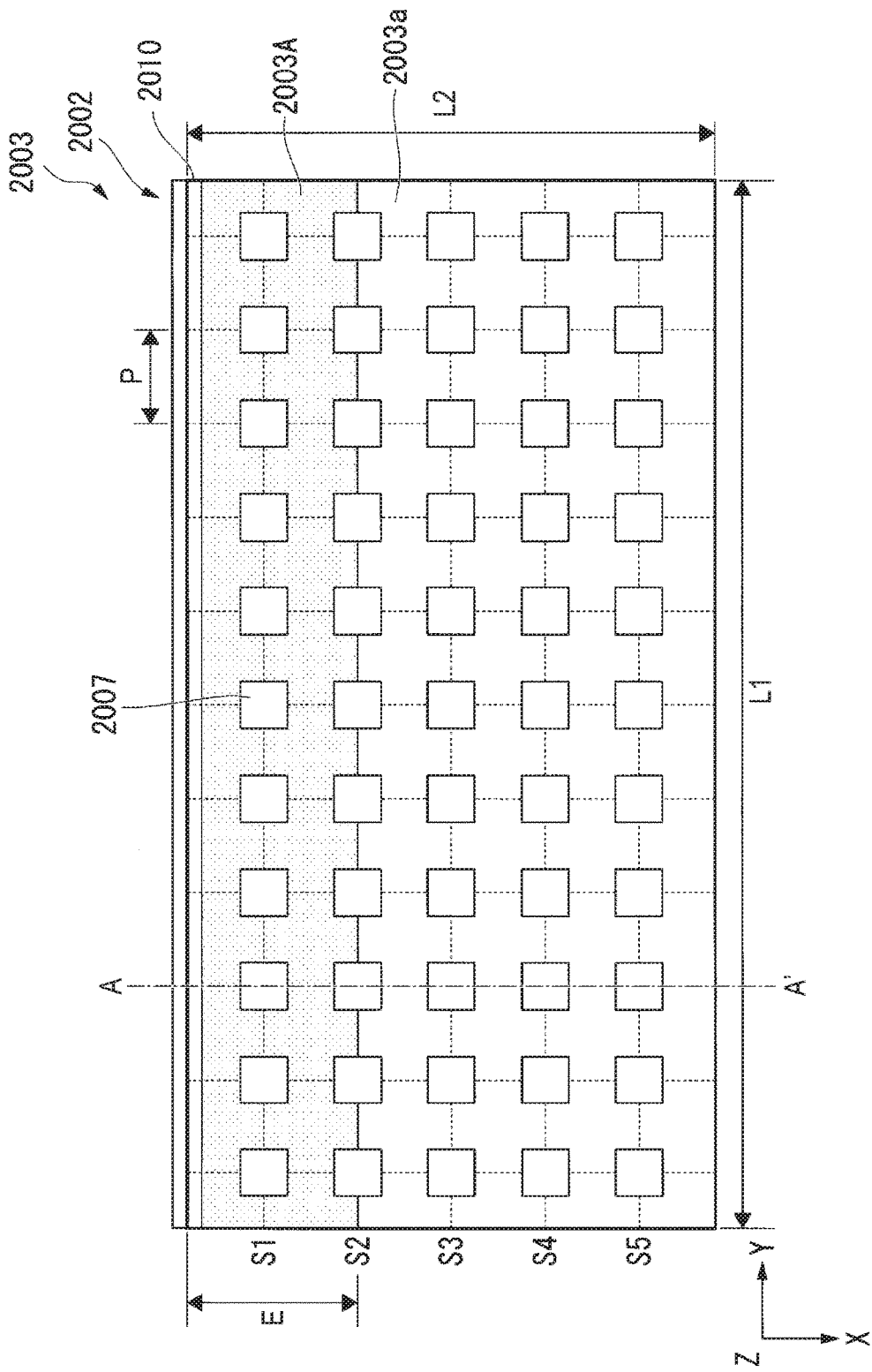
FIG. 27 is a plan view showing a ceiling of a room model.

FIG. 26 is a cross-sectional view taken along line A-A' in FIG. 27 of a room model including a daylighting apparatus and an illumination lighting control system. FIG. 27 is a plan view showing a ceiling of a room model 2000.

In the present invention, a room 2003 into which outside light is introduced may have a ceiling 2003a constituted by a ceiling material having high light reflectivity. As shown in FIGS. 26 and 27, as the ceiling material having light reflectivity, a light reflective ceiling material 2003A is installed on the ceiling 2003a of the room 2003.

The light reflective ceiling material 2003A is intended to facilitate the introduction of outside light into the back of the room from a daylighting apparatus 2010 installed in a window 2002. The light reflective ceiling material 2003A is installed on the ceiling 2003a by the window. Specifically, the light reflective ceiling material 2003A is installed in a predetermined region E (i.e. a region that is approximately 3 m away from the window 2002) on the ceiling 2003a.

As mentioned earlier, the light reflective ceiling material 2003A functions to effectively guide, into the back of the room, the outside light introduced into the room through the window 2002 on which the daylighting apparatus 2010 of the present invention (i.e. the daylighting apparatus according to any of the embodiments described above) is installed. The outside light introduced from the daylighting apparatus 2010 toward the ceiling 2003a inside the room is reflected by the light reflective ceiling material 2003A, changes its direction, and illuminates a desk top surface 2005a of a desk 2005 put in the back of the room, thus bringing about an effect of brightening up the desk top surface 2005a.

The light reflective ceiling material 2003A may be a diffuse reflective material or a specular reflective material. However, in order to bring about both an effect of brightening up the desk top surface 2005a of the desk 2005 put in the back of the room and an effect of reducing the glare that is unpleasant to a person who is in the room, it is preferable that the light reflective ceiling material 2003A possess an appropriate mixture of the properties of both a diffuse reflective material and a specular reflective material.

Although much of the light introduced into the room by the daylighting apparatus 2010 of the present invention travels toward the ceiling near the window 2002, the amount of light is often sufficient in the vicinity of the window 2002. For this reason, combined use of such a light reflective ceiling material 2003A diverts the light having fallen on the ceiling (region E) near the window into the back of the room, where the amount of light is smaller than it is by the window.

The light reflective ceiling material 2003A may be prepared either by embossing a metal plate of aluminum or the like so that the metal plate has depressed and raised portions on the order of several tens of micrometers or by depositing a metal thin film of aluminum or the like on a surface of a similarly embossed resin substrate. Alternatively, the depressed and raised portions that are formed by the embossing may be formed by curved surfaces at larger intervals.

Furthermore, the distribution property of light and the distribution of light inside the room can be controlled by appropriately changing the embossed shapes that are formed in the light reflective ceiling material 2003A. For example, in the case of embossing in stripes that extend into the back of the room, light reflected by the light reflective ceiling material 2003A spreads in a transverse direction (i.e. a direction intersecting a longitudinal direction of the depressed and raise portions). In a case where the window 2002 of the room 2003 is limited in size and orientation, such properties are utilized so that the light reflective ceiling material 2003A can diffuse the light in a horizontal direction and reflect the light toward the back of the room.

The daylighting apparatus 2010 of the present invention is used as part of the illumination lighting control system of the room 2003. The illumination lighting control system is constituted by constituent members of the whole room, for example, including the daylighting apparatus 2010, a plurality of indoor illuminating apparatuses 2007, an insolation adjusting apparatus 2008 installed on the window, a control system of these components, and the light reflective ceiling material 2003A installed on the ceiling 2003a.

The daylighting apparatus 2010 is installed on the upper part of the window 2002 of the room 2003, and the insolation adjusting apparatus 2008 is installed on the lower part of the window 2002 of the room 2003. Although a blind is installed as the insolation adjusting apparatus 2008 here, the isolation adjusting apparatus 2008 is not limited to this.

In the room 2003, the plurality of indoor illuminating apparatuses 2007 are arranged in gridlike fashion in the transverse direction (Y direction) of the window 2002 and the depth direction (X direction) of the inside of the room. The plurality of indoor illuminating apparatuses 2007 are combined with the daylighting apparatus 2010 to constitute the whole illuminating system of the room 2003.

FIGS. 26 and 27 show as an example the ceiling 2003a of an office in which the length $L_1$ of the window 2002 in the transverse direction (Y direction) is 18 m and the length $L_2$ of the room 2003 in the depth direction (X direction) is 9 m. In this example, the indoor illuminating apparatuses 2007 are arranged in gridlike fashion at intervals P of 1.8 m in both the transverse direction (Y direction) and depth direction (X direction) of the ceiling 2003a.

More specifically, fifth indoor illuminating apparatuses 2007 are arranged in 10 columns (Y direction) and five rows (X direction).

Each of the indoor illuminating apparatuses 2007 includes an indoor illuminator 2007a, a brightness detecting section 2007b, and a control section 2007c, and the brightness detecting section 2007b and the control section 2007c are integrated with the indoor illuminator 2007a.

Each of the indoor illuminating apparatuses 2007 may include a plurality of the indoor illuminators 2007a and a plurality of the brightness detecting sections 2007b. Note, however, that the brightness detecting sections 2007b are provided one by one for each separate indoor illuminator 2007a. Each of the brightness detecting sections 2007b receives light reflected by an irradiated surface illuminated by the corresponding indoor illuminator 2007a and detects the illuminance of the irradiated surface. In this example, the illuminance of the desk top surface 2005a of the desk 2005 put in the room is detected by the brightness detecting section 200b.

The control sections 2007c provided one by one for each separate indoor illuminating apparatus 2007 are connected to each other. The mutual connection between the control sections 2007c allows each of the indoor illuminating apparatuses 2007 to perform feedback control to adjust the optical output of an LED lamp of a corresponding indoor illuminator 2007a so that the illuminance of the desk top surface 2005a as detected by the corresponding brightness detecting section 2007b becomes a given target illuminance L0 (e.g. an average illuminance of 750 lx).

Figure 28:
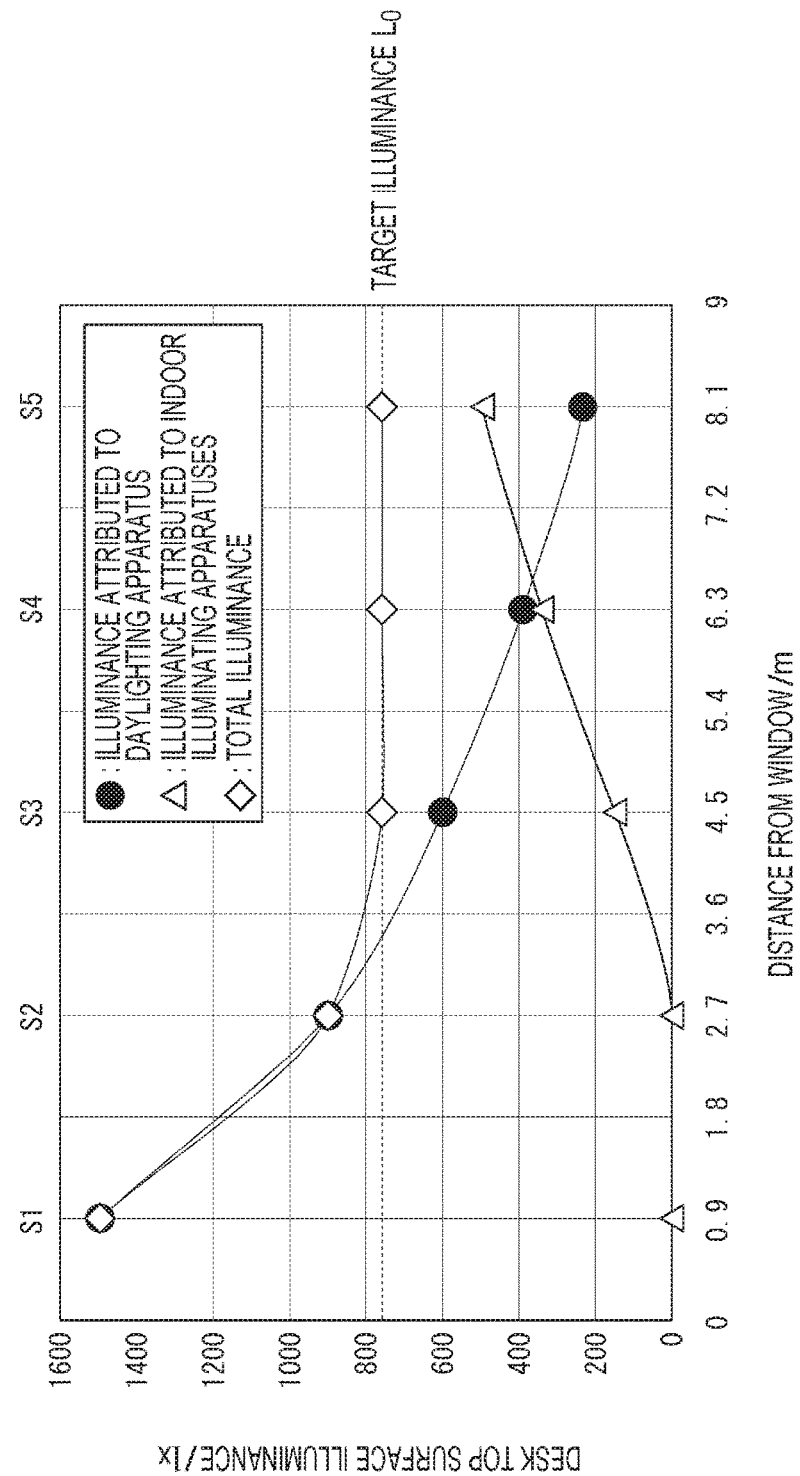
FIG. 28 is a graph showing a relationship between the illuminance of light (natural light) let inside a room by a daylighting apparatus and the illuminance (illumination lighting control system) attributed to indoor illuminating apparatuses.

FIG. 28 is a graph showing a relationship between the illuminance of light (natural light) let inside the room by the daylighting apparatus and the illuminance (illumination lighting control system) attributed to the indoor illuminating apparatuses. In FIG. 28, the horizontal axis represents the illuminance (lx) of the desk top surface, and the horizontal axis represents the distance (m) from the window. Further, in FIG. 28, the dotted line indicates the target illuminance inside the room. (●: Illuminance attributed to the daylighting apparatus, △: Illuminance attributed to the indoor illuminating apparatuses, ◇: Total illuminance)

As shown in FIG. 28, the desk top surface illuminance attributed to the light let in by the daylighting apparatus 2010 becomes higher toward the vicinity of the window and becomes smaller in effect with distance from the window. In a room to which the daylighting apparatus 2010 of the present invention is applied, natural daylighting through the window during the daytime yields such a distribution of illuminance in a direction toward the back of the room. Accordingly, the daylighting apparatus 2010 of the present invention is used in combination with the indoor illuminating apparatuses 2007, which compensate for the distribution of illuminance inside the room. The indoor illuminating apparatuses 2007 installed on the ceiling inside the room light under such lighting control that average illuminances below the apparatuses are detected by the brightness detecting sections 2007b, respectively, and the desk top surface illuminance of the whole room becomes the given target illuminance L0. Therefore, the rows S1 and S2 installed in the vicinity of the window hardly light, and the rows S3, S4, and S5 light with higher outputs toward the back of the room. As a result, the desk top surface of the room is illuminated by the total of the illuminance attributed to natural daylighting and the illuminance attributed to the indoor illuminating apparatuses 2007, so that a desk top surface illuminance of 750 lx, which is believed to be sufficient for work across the whole room, can be achieved. (Recommended maintenance illuminance in office, "JIS Z9110 General rules of recommended lighting levels").

As mentioned above, combined use of the daylighting apparatus 2010 and the illumination lighting control system (indoor illuminating apparatuses 2007) allow light to reach the back of the room, thus making it possible to further increase the brightness of the inside of the room and ensure a desk top surface illuminance believed to be sufficient for work across the whole room. This provides a more stable bright light environment regardless of seasons or weathers.

While preferred embodiments of the present invention have been described above with reference to the accompanying drawings, components of the embodiments, combinations thereof, and the like are mere examples, and needless to say, the present invention is not limited to such examples. It is apparent that a person skilled in the art could conceive of various modifications and alterations, and of course, such modifications and alterations are understood as falling within the technical scope of the present invention.

INDUSTRIAL APPLICABILITY

An aspect of the preset invention is applicable to a daylighting member, a daylighting apparatus, a roll screen, a blind, and the like that can suppress an increase in glared and, at the same time, ensure a lighted environment inside a room by letting in more natural light (sunlight) from outside.

REFERENCE SIGNS LIST 1, 13, 15, 17, 18, 300, 400, 500 Daylighting member
2 First substrate
2a First surface
3 Daylighting portion (protruding portion)
3C Reflection surface
10 First daylighting section
14 Light-blocking section (light amount adjusting section)
16 Transparent section (transparent member)
19, 40, 2010 Daylighting apparatus
20, 24, 25 Second daylighting section
26 Fitting section
28 Daylighting sheet (daylighting member)
30 Blind (daylighting apparatus)
31 Slat
33 First daylighting slat
35 Second slat
43 Tilting operation section (tilting mechanism)
51 Daylighting mechanism
52 Light-blocking mechanism
55, 63 Winding mechanism
60 Roll screen
62A, 62B Daylighting screen
S1 First space
S2 Second space
109 Window frame (object of installation)

The invention claimed is:

1. A daylighting member comprising:
a first daylighting section; and
a second daylighting section having different daylighting properties from the first daylight section, wherein
the first daylighting section includes an optically transparent first substrate and a plurality of optically transparent protruding portions provided on a first surface of the first substrate,
the first daylighting section reflects incoming light in a desired direction and emits the incoming light,
the second daylighting section diffuses and emits the incoming light and does not include the plurality of optically transparent protruding portions,
the first daylighting section and the second daylighting section are placed side by side in a direction parallel to the first surface,
each of the protruding portions includes a side surface, a portion of which functions as a reflection surface that reflects light having entered the protruding portion,
a given ray of light of the light having entered the protruding portion passes through a point F at which the ray of light is incident on the reflection surface, and
in a case where, of two spaces bordering across a virtual plane perpendicular to the first surface of the first substrate, a first space is a space in which the ray of light passing through the point F is present and a second space is a space in which the ray of light passing through the point F is not present, light emitted from the first substrate or the protruding portion by being reflected by the reflection surface has a property of traveling into the first space.

2. The daylighting member according to claim 1, wherein the first daylighting section and the second daylighting section are placed side by side in a direction intersecting a direction in which the protruding portions extend.

3. The daylighting member according to claim 1, further comprising a light amount adjusting section provided between the first daylighting section and the second daylighting section so as to adjust an amount of transmitted light,
wherein the light amount adjusting section transmits a smaller amount of light than does each of the first and second daylighting sections.

4. The daylighting member according to claim 3, wherein the light amount adjusting section has such a property that the amount of transmitted light becomes gradually smaller from the first daylighting section toward the second daylighting section.

5. The daylighting member according to claim 1, further comprising a transparent member provided between the first daylighting section and the second daylighting section,
wherein the transparent member transmits light in a state where an angle of incidence of the incoming light and an angle of emission of outgoing light are substantially equal.

6. The daylighting member according to claim 1, wherein the second daylighting section is anisotropic in direction of diffusion of light and diffuses the light more strongly in a direction parallel to a direction intersecting a direction of placement of the first and second spaces than in the direction of placement.

7. The daylighting member according to claim 1, wherein the second daylighting section isotropically diffuses and emits the incoming light.

8. The daylighting member according to claim 1, wherein the second daylighting section has such a property as to become gradually lower in light transmittance from a first end side thereof that faces the first daylighting section toward a second end side of the second daylighting section.

9. The daylighting member according to claim 1, wherein the second daylighting section contains a luminescence material.

10. A daylighting apparatus comprising:
a daylighting member; and
an adhesive layer that sticks the daylighting member to an object of installation,
wherein the daylighting member is a daylighting member according to claim 1.

11. A daylighting apparatus comprising:
a daylighting member; and
a fitting section that detachably fits the daylighting member in an object of installation,
wherein the daylighting member is a daylighting member according to claim 1.

12. A daylighting apparatus comprising:
a daylighting mechanism; and
a light-blocking mechanism hung in a vertical direction from a lower portion of the daylighting mechanism,
wherein the daylighting mechanism is a daylighting member according to claim 1, and
the light-blocking mechanism is a roll screen or a blind.

13. A roll screen comprising:
a daylighting screen; and
a winding mechanism that makes the daylighting screen freely windable,
wherein the daylighting screen is a daylighting member according to claim 1.

14. A blind comprising:
the daylighting member according to claim 1;
a plurality of first slats arranged side by side at predetermined intervals in a first region;
a plurality of second slats arranged side by side at predetermined intervals in a second region placed next to the first region in a direction intersecting a direction in which the first slats extend; and
a tilting mechanism that supports the first slats and second slats so that the first slats and second slats are freely tilted to each other,
wherein each of the first slats is the first daylighting section, and
each of the second slats is the second daylighting section.

15. The daylighting member according to claim 1, wherein a thickness of the first daylighting section is a same thickness as the second daylighting section.

* * * * *